(12) United States Patent
Myers et al.

(10) Patent No.: US 7,091,445 B2
(45) Date of Patent: Aug. 15, 2006

(54) ELECTRIC ARC WELDER AND METHOD FOR CONTROLLING THE WELDING PROCESS OF THE WELDER

(75) Inventors: Russell K. Myers, Hudson, OH (US); William S. Houston, Avon, OH (US); Timothy M. O'Donnell, Chesterland, OH (US); Robert Hasan, Euclid, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 173 days.

(21) Appl. No.: 10/603,322

(22) Filed: Jun. 26, 2003

(65) Prior Publication Data

US 2004/0079740 A1    Apr. 29, 2004

Related U.S. Application Data

(60) Provisional application No. 60/421,078, filed on Oct. 25, 2002.

(51) Int. Cl.
*B23K 9/09*    (2006.01)

(52) U.S. Cl. ............... 219/130.32; 219/130.51

(58) Field of Classification Search ........... 219/130.21, 219/130.31, 130.32, 130.33
See application file for complete search history.

(56) References Cited

U.S. PATENT DOCUMENTS 4,125,759 A * 11/1978 Kiyohara et al. ...... 219/130.32
4,821,202 A * 4/1989 Davis et al. ........... 219/130.21
5,278,390 A    1/1994 Blankenship
5,386,096 A    1/1995 Buda et al.

FOREIGN PATENT DOCUMENTS

| JP | 62-096866 | 8/1986 |
|---|---|---|
| JP | 2001-129667 | 5/2001 |
| JP | 2001-259837 | 9/2001 |

OTHER PUBLICATIONS

Jack W. Crinshaw *Embedded Systems Programming* (Integer Square Root)—Feb. 1998.
*Electrical Measurements and Heat Input Calculations for GMAW-P Process*—Nov. 2001.

* cited by examiner

*Primary Examiner*—Clifford C. Shaw
(74) *Attorney, Agent, or Firm*—Fay, Sharpe, Fagan, Minnich & McKee, LLP

(57) ABSTRACT

Electric arc welder (10) performs a given weld process with selected current waveform performed between electrode (24) and workpiece (26). Welder (10) includes a controller with a digital processor (30), sensor (44) for reading instantaneous weld current, and circuit (56) to convert the instantaneous current into a digital representation of the level of instantaneous weld current. Digital processor (30) has program circuit (64, 66) to periodically read and square the digital representation at a given rate, register (70, 72) for summing a number N of square digital representations to give a summed value, and an algorithm (82, 84, 86, 88) for periodically dividing the summed value by the number N to provide a quotient and then taking the square root of said quotient to thereby digitally construct rms signal (40) representing the root mean square of the weld current.

100 Claims, 13 Drawing Sheets

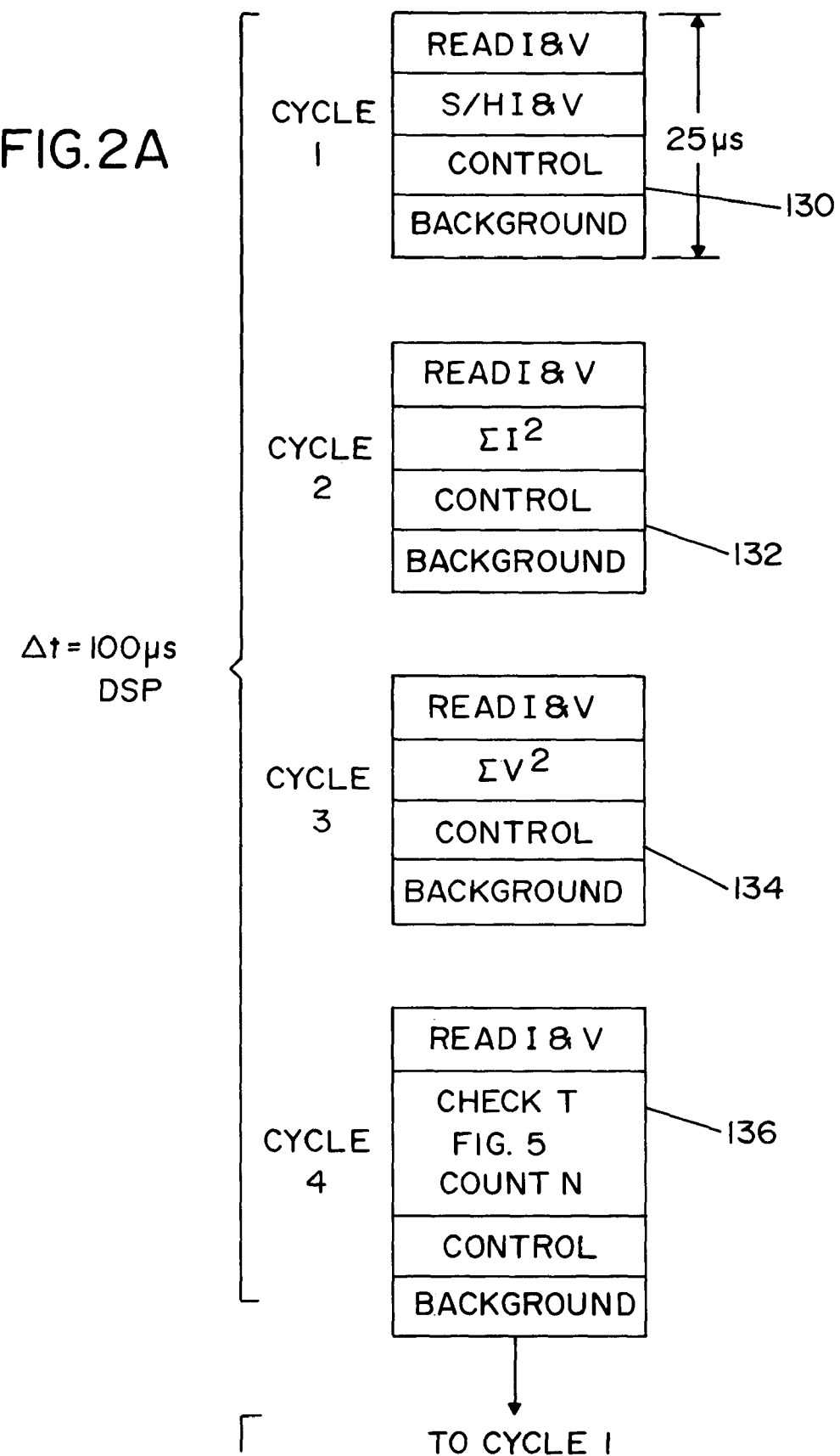

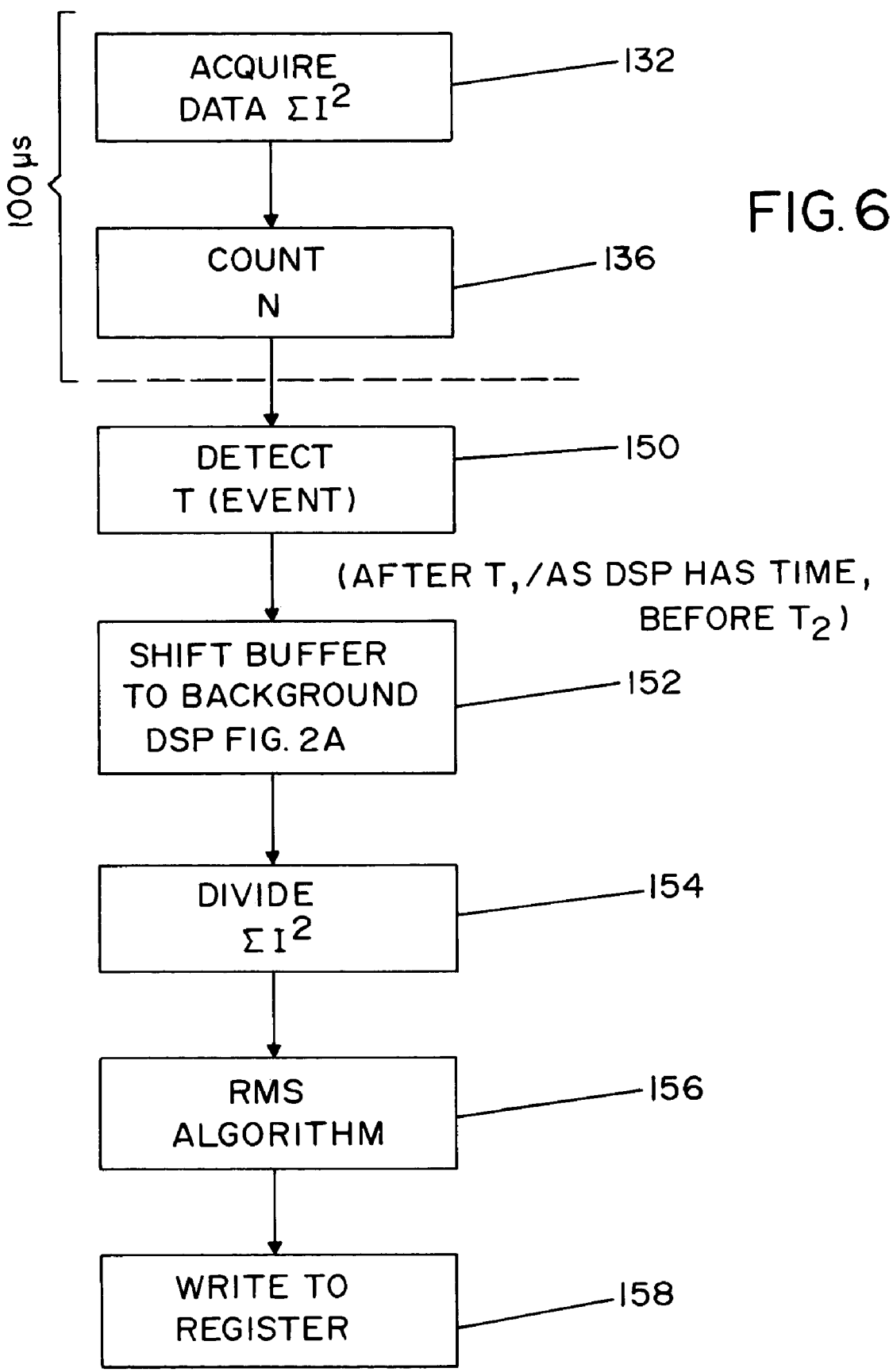

ELECTRIC ARC WELDER AND METHOD FOR CONTROLLING THE WELDING PROCESS OF THE WELDER

This application claims the benefit of U.S. Provisional Application No. 60/421,078, filed Oct. 25, 2002.

The present invention relates to the field of electric arc welding and more particularly to a novel electric arc welder and a system and method for controlling the welding process performed by the welder.

INCORPORATION BY REFERENCE

The invention relates to an electric arc welder for performing a welding process between an electrode and a workpiece wherein the welding process is comprised of a succession of current waveforms. Such current waveforms are created by a number of individual current pulses occurring at a frequency of at least 18 kHz with a magnitude of each of the current pulses being controlled by a wave shaper or waveform generator. In this type of electric arc welder, the waveform generator or wave shaper digitally controls a digital pulse width modulator, usually a program in the controller DSP. The pulse width modulator controls the switching of a high speed switching type power source, such as an inverter. This waveform control technology implemented in an electric arc welder has been pioneered by The Lincoln Electric Company of Cleveland, Ohio and is generally disclosed in Blankenship U.S. Pat. No. 5,278,390. The Blankenship patent is incorporated by reference herein as background illustrating a high speed switching power source, such as a inverter, for controlling a weld process including a series of controlled waveforms determined by the output of a waveform generator or wave shaper.

The invention involves an embedded algorithm for obtaining the root mean square of either the welding current or the welding voltage, as well as average power. The concept of an embedded system programming of the type used in the present invention is generally disclosed in an article by Jack W. Crinshaw entitled *Embedded Systems Programming* (Integer Square Root) This article published in February 1998 is incorporated by reference herein as illustrating the background technology used in the digital signal programmer of a standard controller associated with an electric arc welder. Also incorporated by reference herein is an article entitled *Electrical Measurements and Heat Input Calculations for GMAW-P Process* dated November 2001. This article teaches away from the present invention and suggests that electric arc welding should be controlled by the average current using a slow sample rate no greater than 4.5 kHz. This article is incorporated by reference illustrating the advantage of the use of the present invention over prior suggestions.

BACKGROUND OF THE INVENTION

As illustrated in prior patents and literature, electric arc welding has heretofore used the average weld voltage and the average weld current for controlling the operation of the power source in the welder. The digital controller includes a digital signal processor (DSP) for controlling a waveform generator or wave shaper that directs the operation of the normal pulse width modulator. This device creates the waveforms successively used by the welder to perform the welding process. Welders regulate the output current or voltage to an average value such as an average weld current by a feedback loop. For a constant voltage process that is welding in the "spray" region, the average current is an accurate gage of the welding process. However, in pulse welding, the average current and average voltage do not accurately reflect the result of the welding process including the deposition rate, heat zone and penetration. This is explained by a example of an ideal pulse welding process, such as one having 500 amperes for 25% of the time and 100 amperes of background current for 75% of the time has an output current of 200 amperes. However, the average current of the welding process merely indicates the deposition rate and does not reflect the true heat input to the welding operation. Consequently, when the welding process is controlled by a series of repetitive waveforms, such as A.C. welding or pulse welding, average current values can not control the heat input. Recently, the welding processes have become quite complex and now often involve a number of successive waveforms, such as A.C. current and pulse current, so the old technology of feedback control for the welding process is not completely accurate and requires a substantial amount of on-site manipulation by a person knowledgeable in welding, especially a person knowledgeable in the new waveform welding procedure using a welder, such as shown in Blankenship U.S. Pat. No. 5,278,390. With the advent of pulse welding using waveform generators and high speed switching power sources, such as inverters, the obtained weld heat has been adjusted by trial and error. Too much heat causes metal to burn through, especially in thin metal welding. Thus, the welding engineer modulates the average current and average voltage to provide the heat input to the welding process to a level so that burn through is theoretically eliminated. This procedure was applicable, however, only for a pure spray type welding process. This procedure of controlling the heat by the average current and average voltage was not applicable to the new generation of electric arc welders where waveforms are changed to control the welding process. This is the new waveform control technology to which the present invention is directed. The old technology used for non-waveform welding is inapplicable to controlling heat in a controlled waveform type welder. The heat is not known by merely reading the voltage and current when the new waveform type arc welders are employed. Consequently, the welding engineer when using waveform control technology changed the base frequency during pulse welding while maintaining a constant or set average voltage. Using this approach of frequency adjustment of a pulse welding procedure while maintaining a constant voltage, the heat could be adjusted by a trial and error technique. When this trial and error procedure was used to modify the waveforms in a new waveform welder, the heat could, indeed, be controlled; however, it was not precise and involves substantial technical knowledge combined with the trial and error procedures.

There is a distinct advantage in pulse welding. This welding process lowers the heat into the joint for the same wire feed speed as a "spray" or "globular" weld process. Thus, a lower heat setting can be set at the factory. The welder had a knob to adjust the nominal frequency, for the purpose indicated above. This change in base frequency did adjust the heat at the welding operation. This resulted in a slight change in the power factor of the welding process through the trial and error method when knowing that the average voltage times average current multiplied by the power factor equals the input heat. Thus, by using a knob to change the base frequency, the power factor was changed to determine heat. However, neither the factory nor the welding engineer at the welding site had the capabilities of directly controlling the power factor. Computation of actual power factor on the fly was not realized in prior control systems and method used for electric arc welders even of the type that used a waveform or wave shape control of the welding process. Consequently, with the introduction of the new waveform welding pioneered by The Lincoln Electric Company, there is a need to control the welding parameters to a value that accurately reflects the heat content. Only in this manner can weld parameters be used in a closed loop feedback system, or otherwise, to control the penetration and heat separately in a weld process using generated waveforms.

SUMMARY OF THE INVENTION

With the advent of the new wave shapes developed for electric arc welding, the present invention provides a control of the welding parameters to accurately reflect the heating content without use of trial and error procedures or the need for on site welding engineers to modulate and control the welding process. The invention is in welding with a series of generated waveforms, such as A.C. welding or pulse welding.

In order to produce a stable weld while continuously feeding wire into the weld puddle, there are primarily two factors that must be balanced. First, the amount of weld metal wire and its material properties determine how much current is needed to melt the wire. Second, the amount of heat determines the heat affected zone or penetration of the welding process. In the past, an operator dialed in a voltage and wire feed speed and manually adjusted the electric stickout to control the amount of heat put into the weld. Welding literature typically claims that the pulse welding process lowers the current for the same deposition rate of a "spray" procedure. This is technically accurate. The average current is, indeed, much less than the average current of an equivalent "spray" procedure when using "pulse" welding. However, the rms currents of both procedures are about the same. The present invention involves the use of rms current for the feedback loop control of the welding process. Thus, the invention involves the use of rms current and rms voltage for controlling the welding process, especially when using a series of generated pulse waves, such as in A.C. welding and "pulse" welding using the technology described in Blankenship U.S. Pat. No. 5,278,390. By using the rms current and rms voltage, a more accurate control of the waveform type welding process is maintained. In accordance with the invention, the rms value and the average value of current and voltage can be used for feedback control. In this aspect of the invention, a first constant is multiplied by the rms value and a second constant is multiplied by the average value of the parameter. These two constants total one, so the constituent of root mean square in the feedback control is adjusted with respect to the constituent of average in the feedback control. These constants preferably total one. In practice, the rms constant is substantially greater than the average value constant so that normally the rms value is predominate over the average value. It has been found that the rms value more accurately reflects the heating value of the welding process.

In accordance with a primary aspect of the invention, the feedback control of the electric arc welder maintains the rms voltage and rms currents constant, while adjusting the calculated real time power factor. This procedure of adjusting the power factor adjusts the heat input to the weld procedure to a desired level.

Since the rms values of current and voltage are obtained by using the present invention, the power factor can be obtained by calculations within an embedded algorithm in the digital signal processor of the electric arc welder. By maintaining the power factor constant, the electric arc welder will automatically adjust for tolerances experienced in cable impedance at the welding site. By maintaining the power factor constant by using the present invention, the control for the welding process of the electric arc welder can be set at the manufacturing facility by setting the power factor at a given value and the rms current at a given value. When the welder is then installed at the manufacturing facility, the rms current is maintained at the desired constant set at the factory and the power factor is maintained at the set value. The power factor is, thus, accurately controlled at the site. By use of the present invention irrespective of changes in the cable impedance, the welding process will be the same.

In the present invention the term "power factor" relates to the power factor of the welding process. This is a parameter obtained by using the present invention through the digital signal processor (DSP) of a welder having an embedded algorithm for calculating the root mean square of both current and voltage. By using the present invention, the power factor is held constant by a closed loop feedback. This feedback system keeps the heat of the welding process at a given selected and desired level.

Since the present invention involves the determination of a real time rms value for current and/or voltage, a closed loop feedback maintains the rms current at a constant desired level. The actual power factor is also generated for a closed loop feedback system so that the welding power factor is adjusted to change the average power and, thus, the heat of the welding operation. Consequently, another aspect of the invention is maintaining the rms current constant while adjusting the power factor to change the heat at the welding process. When this is done in a waveform type welder wherein the waveform is created by a number of current pulses occurring at a frequency of at least 18 kHz with a magnitude of each pulse controlled by a wave shaper, the shape of the waveform in the welding process is modified to adjust the power factor. In this aspect of the invention, the current remains constant. This could not be accomplished in other types of welders, nor in waveform control welders, without use of the present invention.

The present invention relates to a control of an electric arc welder of the type wherein a pulse width modulator, normally in the DSP, controls the current waveform constituting the welding process. By using the present invention, the rms current and rms voltage is obtained for the purpose of combining with the average current and average voltage to produce, not only the average power, but also the actual real time power factor. Consequently, the actual power factor can be adjusted, the actual rms current can be adjusted, or the actual rms voltage can be adjusted. In all of these embodiments, the adjustment of the constructed or calculated parameters modifies the waveform to control the welding process accurately in the areas of penetration and heat input. By having the capabilities of the present invention, power factor manipulation adjusts the heat input of the welding process. In accordance with an aspect of the invention, the feedback of current and voltage is a combination of the rms value and the average value in a method or system where the rms value predominates.

In pulse welding, the rms current and/or the average current is adjusted to maintain a constant rms voltage. When using the invention for A.C. welding, the output of the welder is regulated to provide a constant rms or a constant rms current. Turning now to a MIG welding process, the output of the machine is regulated to maintain a constant rms current. The basic aspect of the invention is creating a rms current value on a real time basis and/or a rms voltage value on a real time basis. These parameters are regulated by changing the wave shape of the welding process utilizing a standard closed loop feedback system or method. By having the capabilities of creating a rms current, power factor is calculated by the digital signal processor of the arc welder for use in either maintaining a constant power factor or adjustment of the power factor to control heat in a pulse welding process.

The invention is primarily applicable for use in an electric arc welder of the type having a pulse shaper or waveform generator to control the shape of the waveform in the welding process. This type of welder has a digitized internal program functioning as a pulse width modulator wherein the current waveform is controlled by the waveform generator or wave shaper as a series of current pulses. The duty cycle of these high speed pulses determines the magnitude of the current at any given position in the constructed waveform of the weld process. This type of welder has a high speed switching power source, such as an inverter. The invention involves the combination of this particular type of power source and implementation of the program and algorithm to form the functions set forth above.

In accordance with the invention, there is provided an electric arc welder for performing a given weld process with a selected waveform performed between an electrode and a workpiece. This type of welder generates the waveforms and includes a controller with a digital signal processor. The sensor reads the instantaneous weld current and a circuit converts the instantaneous current into a digital representation of the level of the instantaneous current. The digital processor has a program circuit or other program routine to periodically read and square the digital representation at a given rate. A register in the processor sums a number of squared digital representations to create a summed value. An embedded algorithm in the processor periodically divides the summed value by a number N, which is the number of samples obtained during the sampling process of the waveform. The quotient provided by dividing the summed value by the number of samples is then directed to the algorithm for taking the square root of the quotient to thereby digitally construct an rms signal representing the root mean square of the weld current. This same procedure is used for obtaining the root mean square or rms signal representing the weld voltage. Consequently, the initial aspect of the invention is the use in a waveform welder, a real time signal indicative of the root mean square of the weld current primarily, but also the weld voltage. These signals have not heretofore been obtainable in an arc welder of the type to which the present invention is directed.

In accordance with another aspect of the invention, the controller of the specific type of waveform welder defined above includes a feedback control loop with an error detector for generating a current control signal based upon the relationship of two signals. This is a standard closed loop system or method. In performing this system or method, the first of the two signals includes the root mean signal obtained by the first aspect of the present invention. The term "included" is used in this aspect of the invention since a modification of the invention has a feedback using a combination of the root mean value of current or voltage plus a component of the average current and voltage. However, in accordance with an aspect of the invention, the rms value predominates, since it has preferred control characteristics. The use of a feedback with a component of the average current or voltage is a more limited aspect of the present invention. In an aspect of the invention, the contributing component of the root mean square and contributing component of the average is equal to one. The root mean square contribution predominates in accordance with an aspect of the invention.

As previously stated, the present invention is directed to an electric arc welder of a specific type wherein a waveform is generated by a waveform generator or wave shaper. Consequently, another aspect of the present invention is the provision of an electric arc welder as defined above wherein the waveform is created by a number of current pulses occurring at a frequency of at least 18 kHz, with a magnitude of each pulse controlled by a wave shaper or waveform generator. The "switching frequency" is the frequency of the pulse width modulator controlling the switching frequency of the power source. This frequency is normally substantially greater than 18 kHz and preferably in the range of 40 kHz.

The invention, as defined above, has a sampling rate for the sensed current and/or voltage. In accordance with another aspect of the present invention, this sampling rate is less than 40 kHz or in another aspect it is in the general range of 5 kHz to 100 kHz. In practice, the sampling rate provides a sample each 0.10 ms. It is anticipated that this rate should have a time as low as 0.025 ms.

In accordance with an aspect of the invention, there are first and second registers, or buffers, for summing the squared digital representations of either current or voltage. A circuit is controlled by the waveform to generate an event signal T at a given location in the waveform. This event signal T stops the sampling and determines the number N of samples taken. This number N is used in processing either the average current or the rms current. By using two registers, or buffers, the squared value is loaded during each sample of the waveform until the circuit determining the end of the waveform is activated to provide an event signal T. Thus, the present invention utilizes the number of samples N and the event signal T to determine the parameters of a given current waveform. These waveforms are repeated and successively analyzed. At the end of the waveform, as announced by the existence of an event signal T, the digital signal processor utilizes its background time to calculate the rms values and other aspects of the invention as the digital signal processor is performing the normal welding control features of the welder. The algorithm calculations is initiated by the existence or creation of the event signal T. The sample number N is obtained by a digital counter that counts at the sample rate and is reset and read at the signal T.

In accordance with still a further aspect of the present invention, there is provided an electric arc welder for performing a given weld process with a selected current waveform performed between an electrode and a workpiece. This welder comprises a controller with a digital signal processor. In accordance with standard technology, the controller has a waveform generator for creating a number of different current pulses occurring at a frequency of at least 18 kHz with a magnitude for each pulse creating the waveform and a feedback current control loop with and error detector program for generating a current control signal based upon the relationship of two input signals. This is essentially waveform technology pioneered by The Lincoln Electric Company. In accordance with the invention, the first input signal includes a rms current signal generated by an algorithm processed by the digital processor. The second signal is a signal representing the desired current or rms signal. Consequently, the desired rms signal selected by the welder manufacturer or adjusted by a welding engineer is tracked by the actual rms current signal of the welder. In this manner, the rms current is held constant. When that occurs, tolerance in the on site cables and other process affecting environmental features are ignored in the welder control scheme. This concept is best used with a calculation of the power factor. Using another aspect of the present invention, the power factor created by using the present invention and the rms current are both maintained constant. Thus, when the welder is programmed at the manufacturing facility with a set rms current and set power factor, these parameters are maintained at the welding operation. Consequently, the welding process at the welding operation duplicates the welding process set into the welder by the welding engineer at the manufacturer of the welder.

Still a further aspect of the present invention is the provision of a method of operating an electric arc welder for performing a given weld process with a selected current waveform performed between an electrode and a workpiece. This method involves the process procedure set forth above, wherein the current is sensed and the root mean square current value is calculated as a signal to be used for feedback control of the electric arc welder. This same method is used for obtaining a rms voltage signal used in controlling the electric arc welder of the present invention. Still another aspect of the present invention is the provision of an electric arc welder for performing a given welding process, as defined above. The welder includes a circuit to sample the weld current of the waveform at a give rate, a detector for creating an event signal at a given location in the waveform, a counter to count the number N of samples in successive event signals, a digital processor with an algorithm to calculate a rms value for the weld current based upon the samples taken and the number N counted. The number N and the event signal T have been described in connection with another aspect of the present invention. The invention is used in the sample concept and event signal concept to create values used in an algorithm of a controller for a specific type of electric arc welder. In this manner, the rms value is used to change the waveform to adjust the operation of the waveform welder. The frequency of the switching power source for creating the waveform has an oscillator with a frequency exceeding 18 kHz. Another aspect of the invention is the method of operating the electric arc welder as defined in this aspect of the invention.

Another basic aspect of the present invention is the provision of an electric arc welder for performing a given welding process with a selected waveform, as defined above. In this aspect of the invention, the welder comprises a power source with a controller having a digital processor including a program to calculate the real time power factor of the weld current and the weld voltage. The program of this aspect of the invention includes an algorithm to calculate the rms weld voltage, the rms weld current and the average power of the power source. The average power is obtained by using a calculated value for the average current and the average voltage. These average values are obtained by the same sampling arrangement described in accordance with the rms portion of the present invention. The sampling and the number of samples is stopped at an event signal T. Then the current and/or voltage digitized values are added and divided by the number of samples. This provides the average current and average voltage. By multiplying this values together the "average power" is obtained. The concept of obtaining an average power for an electric arc welder is not novel. However, the process of obtaining the average power utilizing the sampling concept and the event signal T is novel in a welder of the type using waveforms that constitute the welding process.

In an aspect of the invention, the average power is obtained together with the rms current and the rms voltage. A circuit divides the average power by the rms power to create a signal or level representing the actual real time power factor of the power source. This power factor is compared with the desired power factor to create a corrective value for the wave shaper whereby the actual real time power factor is held at the desired power factor. This maintains a constant power factor. As explained before, by maintaining a constant power factor with a constant rms current, any tolerances in the welding process are overcome so that the welder will operate identically at the site as it did when set up by the manufacturer. This aspect of the invention is primarily employed for pulse welding and changes the shape of the pulse to obtain the desired constant power factor without changing the root mean square current of the welding process.

In accordance with another aspect of the invention relating to the obtained power factor level, the power factor is adjustable to change the heat of the welding process, especially when using the invention for pulse welding. The waveform generator or wave shaper controls the shape of the waveform to adjust the power factor to maintain it constant or to adjust it for the purposes of controlling heat. When this adjustment is employed, the rms current is maintained constant. Thus, the power factor is adjusted without adjusting or changing the actual current. The rms current determines the melting rate of the metal.

In accordance with another aspect of the present invention there is provided a method of controlling an electric arc welder, of the type defined above, which method comprises calculating the actual power factor of the power source using the rms current and the rms voltage. A desired power factor is then selected for the power source and an error signal is obtained by comparing the actual power factor of the power source to the desired power factor of the power source. This is accomplished by adjusting the waveform by the error signal whereby the actual power factor is held at the desired power factor.

The primary object of the present invention is the provision of an electric arc welder of the type using a waveform generator or wave shaper whereby the rms current and/or rms voltage is obtained for controlling the welding process.

Still a further object of the present invention is the provision of a welder as defined above which welder is operated in accordance with a method that calculates the rms current and/or the rms voltage and, from this calculation obtains the actual power factor at the welding process. The power factor value controls the heat or maintains a constant power factor for the weld process.

Still a further object of the present invention is the provision of an electric arc welder and method of operating the same, which welder and method utilizes existing waveform technology and the common digital signal processor of the welder to calculate rms values and use these values for determining the power factor of the welding process so that these parameters are used in the feedback control systems of the electric arc welder.

These and other objects and advantages will become apparent from the following description.

BRIEF DESCRIPTION OF DRAWINGS

The invention is apparent from the drawings which are:

FIG. 2A is a cycle chart of digital signal processor utilized for performing the preferred embodiment of the present invention as set forth in FIG. 2 showing the timing function of the digital signal processor;

FIG. 6 is a flow chart of the preferred embodiment of the present invention as performed in the digital signal processor during the cycles show in FIG. 2A;

DETAILED DESCRIPTION OF THE PREFERRED EMBODIMENTS

Figure 1:
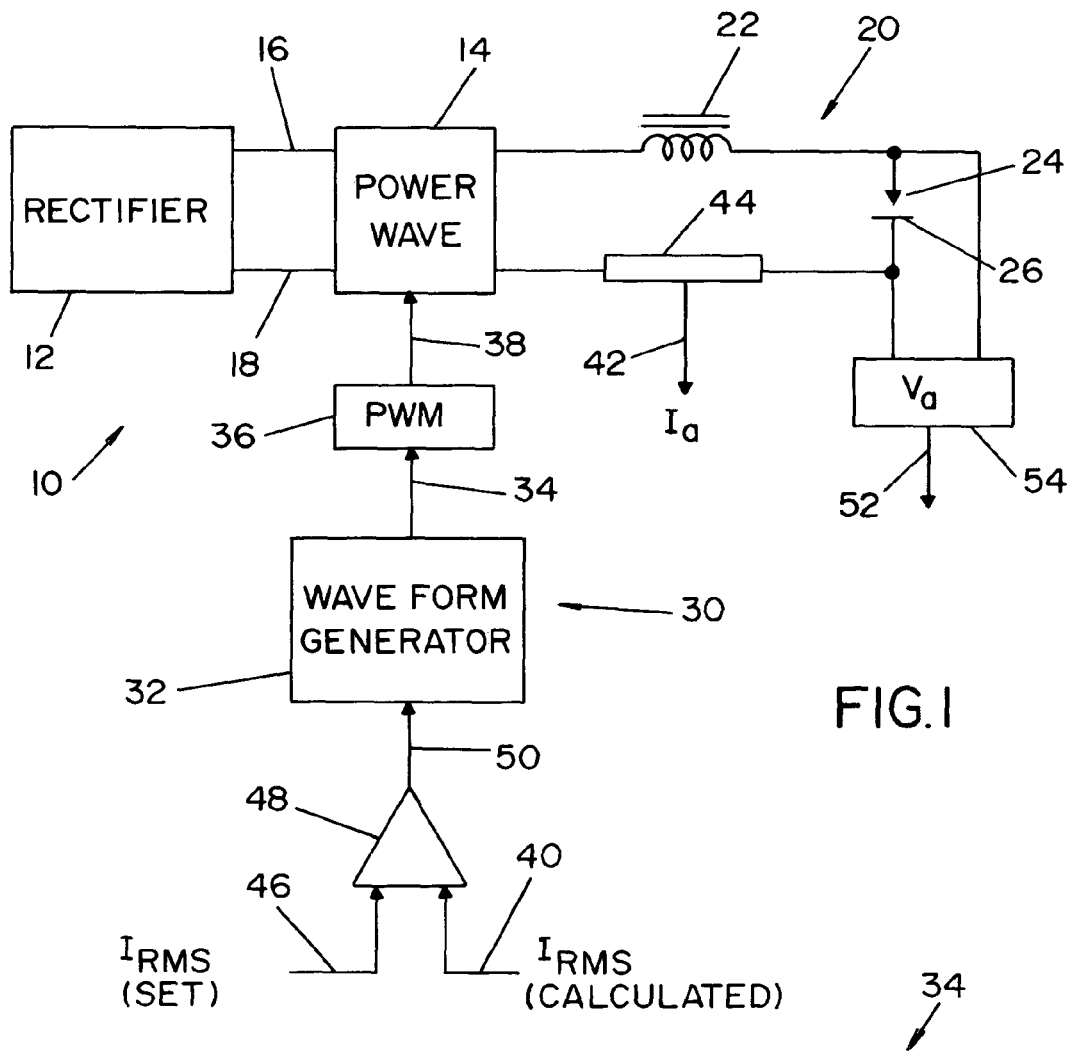
FIG. 1 is a block diagram illustrating an electric arc welder utilizing the present invention for controlling the waveform generator.

With reference to FIG. 1, electric arc welder 10 is shown in block diagram form. A three-phase rectifier 12 provides power to high speed switching-type power supply 14 across a DC link in the form of input leads 16, 18. In a preferred embodiment, high speed switching-type power supply 14 is an inverter, such as a Power Wave welding power supply available from Lincoln Electric Company of Cleveland, Ohio. However, a high speed switching chopper or other high speed switching-type power supply can also be employed. High speed switching-type power supply 14 performs a preselected welding process. In accordance with present welding technology, high speed switching-type power supply 14 preferably switches at about 18 kHz or higher, and more preferably at 40 kHz or higher. High speed switching-type power supply 14 energizes welding circuit 20 that includes inductor 22 and electrode 24 forming an arc gap with workpiece 26 during performance of the welding operation. Typically, electrode 24 is a forward advancing welding wire from a supply spool. The welding wire is driven toward workpiece 26 at a selected wire speed during performance of the welding operation.

Controller 30 controls high speed switching-type power supply 14 during the welding operation. In accordance with the present welding technology, controller 30 is a digital device including waveform generator 32 that outputs power level waveform 34 represented by a line that is the input to pulse width modulator 36. Pulse width modulator 36 produces pulse train 38 (represented by a line) of pulses with pulse widths corresponding to the power level of waveform 34. In other words, waveform 34 is converted into pulse width modulated pulse train signal 38 by pulse width modulator 36. Pulse width modulator 36 produces pulses of controlled width at a frequency preferably above 18 kHz, and more preferably about 40 kHz or higher, which is the input to high speed switching-type power supply 14. The power supply switching is controlled by pulse-width modulated pulse train 38 to energize welding circuit 20 in accordance with power level waveform 34.

Waveform 34 implements a desired welding process. Typically, a welding process is made up of a waveform train of repeating waveforms. For pulse welding, power level waveform 34 has a preselected wave shape for generating a welding process pulse. The average power or true heat produced in the welding process implemented by waveform 34 over a time interval [$T_1$, $T_2$] is given by:

$$P_{avg} = \frac{1}{T_2 - T_1} \int_{T_1}^{T_2} v(t) \cdot i(t) \, dt, \quad (1)$$

where $P_{avg}$ is the average power, v(t) is the instantaneous voltage, i(t) is the instantaneous welding current, v(t)·i(t) is the instantaneous power, and $T_1$ and $T_2$ are the starting and ending time points of the time interval, respectively, of the integration. In the case of a substantially periodic waveform, the average power can be expressed in terms of root-mean-square (rms) voltage and rms current according to:

$$P_{avg} = V_{rms} \cdot I_{rms} \cdot PF \quad (2),$$

where the rms voltage, $V_{rms}$, and rms current, $I_{rms}$, are given by:

$$V_{rms} = \sqrt{\frac{\int_{T_1}^{T_2} [v(t)]^2 dt}{T_2 - T_1}}, \quad I_{rms} = \sqrt{\frac{\int_{T_1}^{T_2} [i(t)]^2}{T_2 - T_1}}, \quad (3)$$

respectively, and PF is the power factor. In computing the average power and the rms current and voltage values for waveform 34 that implements pulse welding, the time interval [$T_1$, $T_2$] preferably corresponds to one pulse or a plurality of pulses. In waveform-controlled welding, the pulse time interval may vary for successive pulses. Hence, in the described preferred embodiment, the starting and stopping times $T_1$ and $T_2$ are extracted from waveform 34 as event signals T determined from a characteristic feature of waveform 34.

Equation (3) can be rewritten to define the power factor PF according to:

$$PF = \frac{P_{avg}}{V_{rms} \cdot I_{rms}}. \quad (4)$$

There is in general a close relationship for substantially any waveform 34 between the rms voltage and current values and the average power.

In contrast, the average voltage, $V_{avg}$, and average current, $I_{avg}$, given by:

$$V_{avg} = \frac{\int_{T_1}^{T_2} v(t) dt}{T_2 - T_1}, \quad I_{avg} = \frac{\int_{T_1}^{T_2} i(t) dt}{T_2 - T_1}, \quad (5)$$

have a close relationship with the average power only for certain waveforms, such as are used in constant-voltage "spray" type welding. However, if, for example, the waveform includes a stepped pulse that is 500 amperes for 25% of the time and 100 amperes for 75% of the time, the rms value is 265 amperes, while the average value is 200 amperes. In this case, the rms values provide a more accurate true heat value.

With continuing reference to FIG. 1, controller 30 of electric arc welder 10 implements an exemplary pulse welding process in which the magnitude of waveform 34 is controlled using an rms current 40 that is calculated from an instantaneous welding current $I_a$ 42 measured across shunt 44. In the constant current welding process shown in FIG. 1, rms current 40 is compared with set rms current 46 by digital error amplifier 48 to produce error signal 50 that controls an amplitude of waveform 34 to maintain a constant rms current. Similarly, for a constant voltage welding process, control is suitably based on an rms voltage calculated from instantaneous welding voltage $V_a$ 52 measured across the weld by voltmeter 54.

Figure 2:
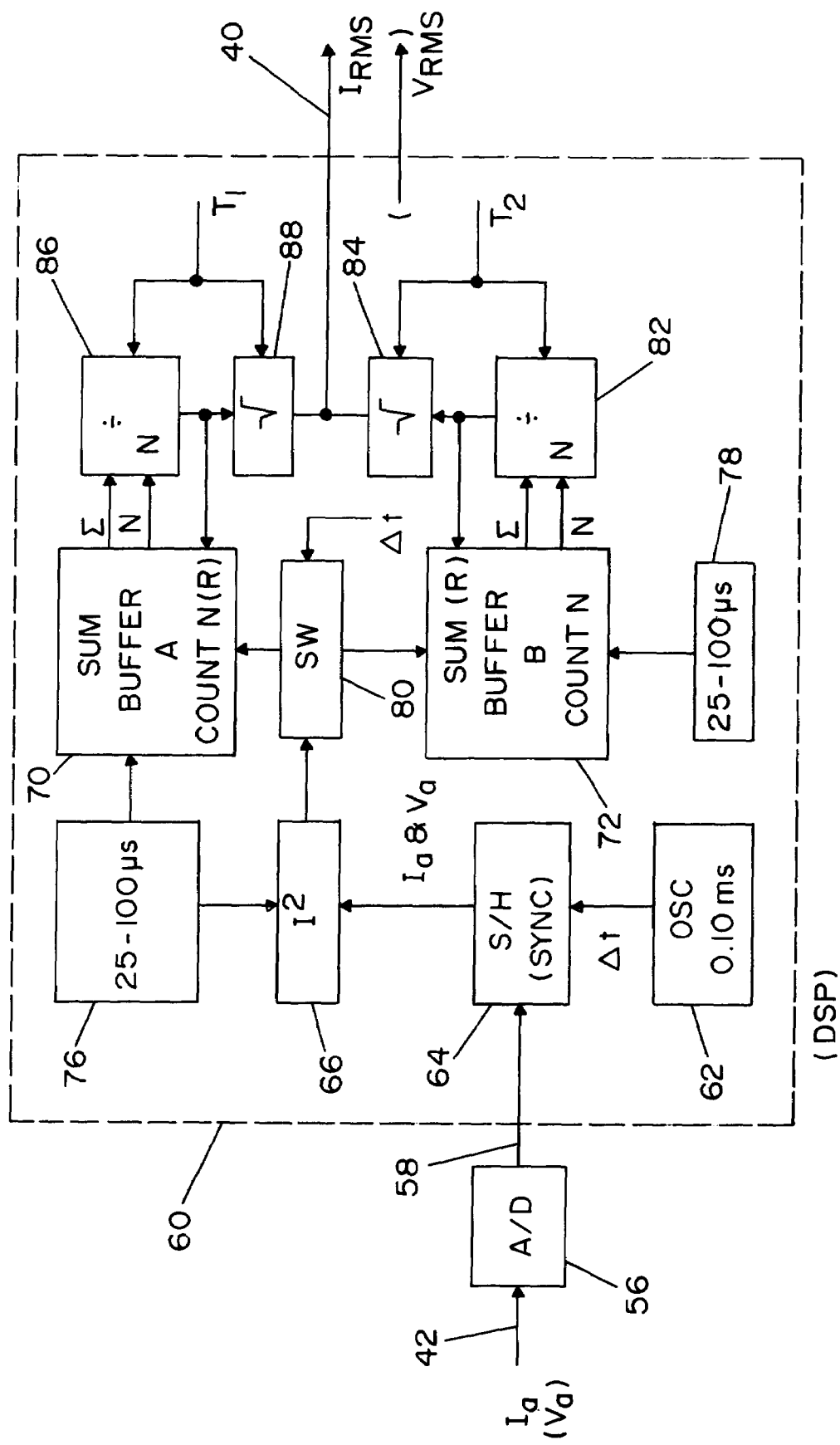
FIG. 2 is a flow chart and block diagram illustrating the computer program of the digital signal processor utilized for performing the preferred embodiment of the present invention.

With reference to FIG. 2, computation of the rms current from instantaneous welding current $I_a$ 42 includes processing with analog-to-digital converter 56 to produce digitized instantaneous current 58, which is the input to digital signal processing block 60. Digital signal processing block 60 performs the current squared integration of Equation (3) digitally as a Riemann sum, dividing the current into time intervals Δt defined by oscillator 62 for the summing. The digitizing interval Δt for the Riemann sum is suitably about 0.1 milliseconds to provide adequate samples for each pulse or repetition of waveform 34. Sample-and-hold circuit 64 holds the digitized current for the period Δt, and squaring processor 66 computes the square of the held current value.

In order to enable continuous summation of rms current in parallel with related processing such as the computation of the square-root operation of Equation (3), the summing preferably employs two alternating storage buffers, namely first buffer 70 (identified as Buffer A), and second buffer 72 (identified as Buffer B). Values are stored in the active buffer at intervals 76, 78 that are preferably in a range of about 0.025–0.100 milliseconds. When first buffer 70 is active, switch 80 transfers values at time intervals Δt to first buffer 70, which accumulates the current-squared values and also maintains a sample count N of a number of accumulated current samples. As a background process during accumulation in first buffer 70, the contents of second buffer 72 are processed by division processor 82 to divide by the number of samples N, and by square-root processor 84 to complete computation of the root-mean-square calculation of Equation (3).

At a selected event signal T generated by a characteristic of waveform 34, the operation of buffers 70, 72 switches. Second accumulator 72 is cleared, and switch 80 subsequently transfers current-squared samples into second accumulator 72. As a background process during accumulation in second buffer 72, the contents of first buffer 70 are processed by division processor 86 to divide by the number of samples N, and by square-root processor 88 to complete computation of the root-mean-square calculation of Equation (3).

Figure 7:
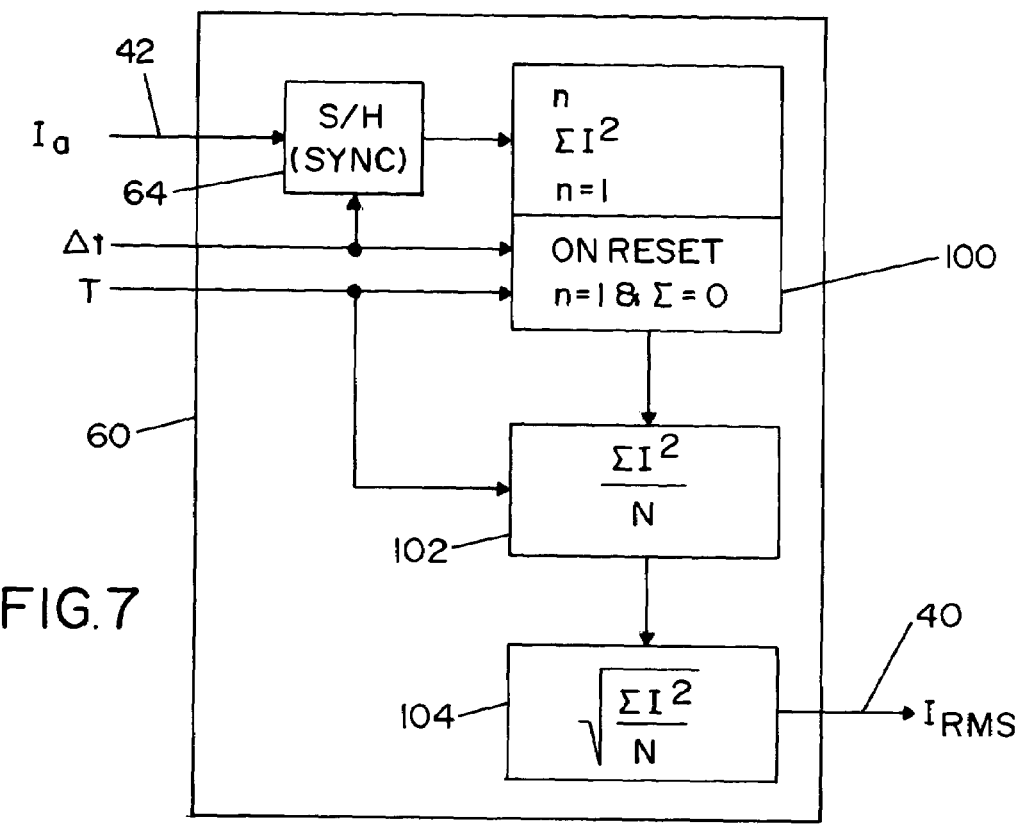
FIG. 7 is a block diagram of the program used to create the rms current signal using the present invention.

FIG. 7 shows a simplified block diagram of digital signal processing block 60, which omits the details of the alternating summation buffers 70, 72 and related switching circuitry that are shown in detail in FIG. 2. In FIG. 7, current-squaring block 66, switch 80, and alternating summation blocks 70, 72 are represented by a single summation block 100 that sums current-squared samples between occurrences of the event signal T triggered by a characteristic of waveform 34, and also maintains the count N of the number of accumulated samples. Division background processes 82, 86 of FIG. 2 are represented by a single normalization background process 102 in FIG. 7. Square-root background processes 84, 88 of FIG. 2 are represented by a single square root background process 104 in FIG. 7.

Figure 8:
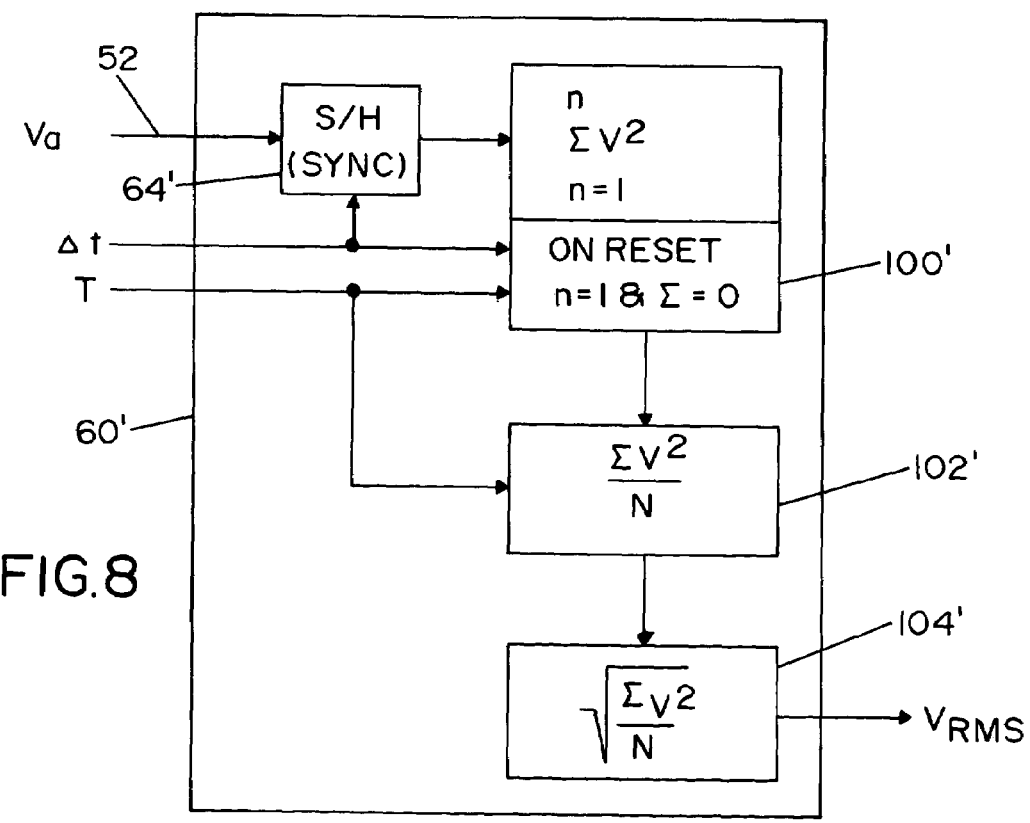
FIG. 8 is a block diagram like FIG. 7 for creating the rms voltage signal.

With reference to FIG. 8, it will be appreciated that digital signal processing block 60 shown in FIG. 2 and represented in simplified form in FIG. 7 is readily adapted to perform rms voltage calculations, by replacing measured instantaneous current $I_a$ 42 with instantaneous voltage $V_a$ 52 measured by voltmeter 54 of FIG. 1. FIG. 8 shows rms voltage digital signal processing block 60' in a simplified form analogous to the simplified form of FIG. 7. The digitized voltage is processed by sample-and-hold circuit 64' which holds the digitized voltage for the period Δt. Voltage-squared summation block 100' sums voltage-squared samples and maintains a count N of the number of accumulated voltage samples. Preferably, summation block 100' uses alternating summation buffers analogous to buffers 70,72 shown for the current-squared summation in FIG. 2. Normalization background process 102' divides the voltage-squared sample sum by the number of samples N. Square root background process 104' takes the square root to complete implementation of the rms voltage $V_{rms}$ mathematically shown in Equation (3).

Figure 9:
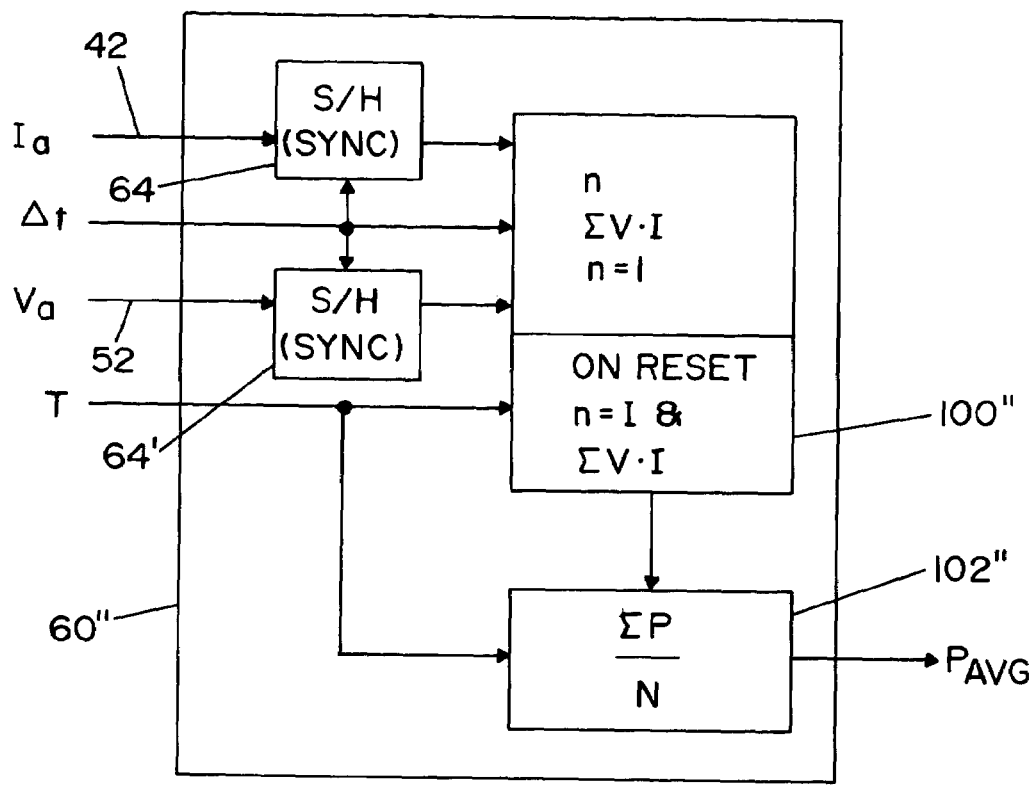
FIG. 9 is a block diagram showing the aspect of the invention for creating an average power signal.

With reference to FIG. 9, it will be appreciated that digital signal processing block 60 shown in FIG. 2 and represented in simplified form in FIG. 7 is similarly readily adapted to perform average power calculations, by inputting both measured instantaneous current $I_a$ 42 and measured instantaneous voltage $V_a$ 52. FIG. 9 shows average power digital signal processing block 60" in a simplified form analogous to the simplified form of FIG. 7. Sample-and-hold circuits 64, 64' which hold the digitized current and voltage, respectively, for the period Δt, are accessed by current-times-voltage summation block 100" which sums current-times-voltage samples and maintains a count N of the number of accumulated current-times-voltage samples. Preferably, summation block 100" uses alternating summation buffers analogous to buffers 70, 72 shown for the current-squared summation in FIG. 2. Normalization background process 102" divides the current-times-voltage sample sum by the number of samples N to produce the average power $P_{avg}$ shown mathematically in Equation (1).

Figure 4:
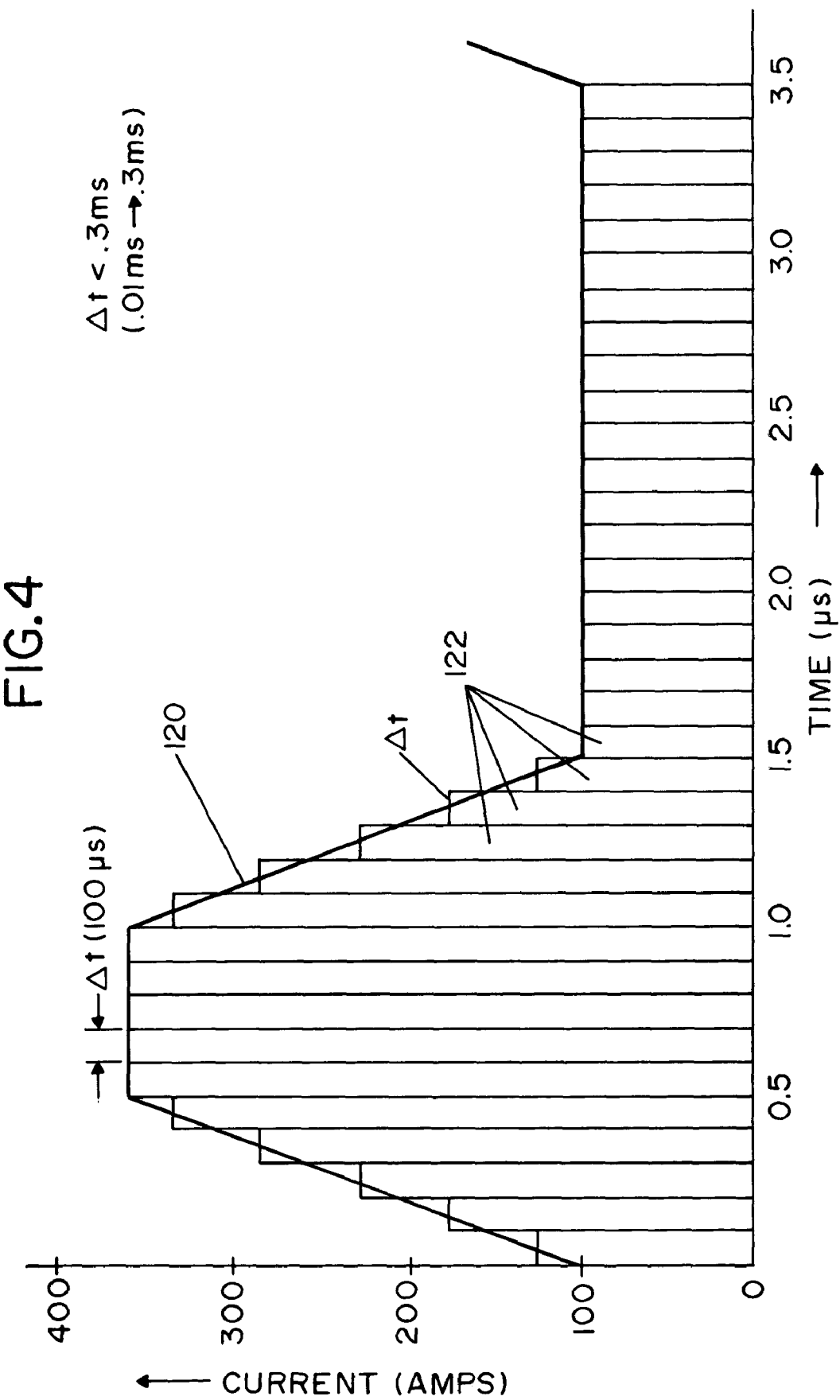
FIG. 4 is a current waveform graph illustrating the sampling concept used in the present invention to create current signals used in obtaining rms values.

Digital signal processing blocks 60, 60', 60" compute the rms current, the rms voltage, and the average power as Riemann sums. FIG. 4 shows exemplary current waveform 120 that is digitally sampled. Each digital sample is represented by a rectangular sample bar 122 of time duration Δt and height corresponding to the digitized value of current waveform 120 held by sample-and-hold circuit 64 at the time interval Δt.

Digital signal processing blocks 60, 60', 60" are optionally implemented as separate processing pathways that execute in parallel. However, in a preferred embodiment digital signal processing blocks 60, 60', 60" use some common digital signal processing blocks into which the sampled voltage and current signals are time-domain multiplexed. Such a multiplexing approach reduces the amount of circuitry required. Each summation (voltage-squared, current-squared, and voltage-times-current) has its own alternating summation buffer set (for example, summation buffer set 70, 72 for summing current-squared values as shown in FIG. 2).

With reference to FIG. 2A, a suitable process cycling for the time-domain multiplexing is shown. The process cycling employs four cycles 130, 132, 134, 136 each occupying one-fourth of the sampling period Δt. For the exemplary Δt equal 0.1 millisecond, each of the four cycles 130, 132, 134, 136 occupies 0.025 milliseconds. During first cycle 130, the voltage $V_a$ and current $I_a$ are digitized and sample/held. During second cycle 132, the current-squared is computed and added to the current-squared summation. During third cycle 134, the voltage-squared is computed and added to the voltage-squared summation. During fourth cycle 136, a check is performed to determine whether an event signal T has been detected, and the sample count is incremented. Moreover, throughout the cycling other processing, such as computation of the square roots of values stored in the inactive summation buffers, can be performed as background processes. Similarly, digital signal processing welding control operations, such as waveform shaping described by Blankenship U.S. Pat. No. 5,278,390, can be performed as background control processes during the cycling.

Figure 3A:
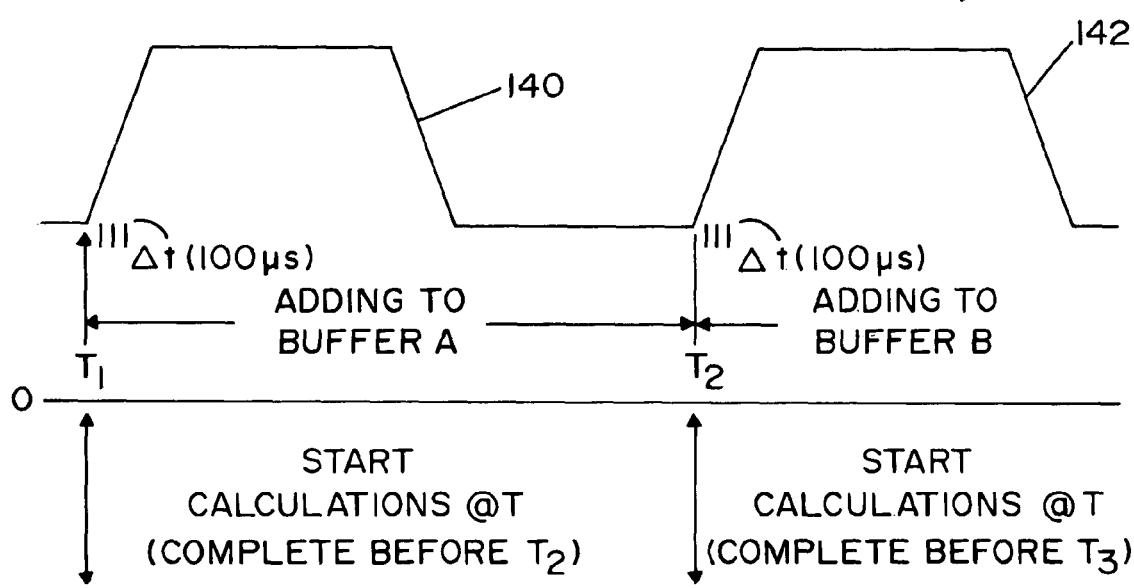
FIG. 3A is a waveform graph for the logic applied to the state table in FIG. 3.

With reference to FIGS. 2 and 2A, and with further reference to FIG. 3A and FIG. 6, the cycling as applied to the current-squared calculation is described. FIG. 3A illustrates current waveform 34 extending between first event signal $T_1$ and second event signal $T_2$. Event signals $T_1$, $T_2$ are suitably generated by a circuit controlled by waveform 34. In FIG. 3A, the circuit generates event signal $T_1$ responsive to onset of the rising edge of current pulse 140, and the circuit generates event signal $T_2$ responsive to onset of the rising edge of current pulse 142. Thus, there is a current pulse between each two successive event signals T. Rather than detecting the rising edge, the event signals can instead be generated by detecting another characteristic of the pulse, such as the falling edge of the current pulse.

During the time interval between event signal $T_1$ and event signal $T_2$, current-squared samples are accumulated in summation buffer 70, as indicated in FIG. 3A by the notation "Adding to Buffer A". Each occurrence of second cycle 132 of FIG. 2A adds another current-squared sample to buffer 70. Although not shown in FIGS. 2, 3A, or 6, voltage-squared samples and average power samples are preferably being accumulated in their respective buffers during the other cycles of the four-cycle process of FIG. 2A. Detection of event signal $T_2$ is indicated by detection block 150 of FIG. 6. Responsive to detection 150, buffers 70, 72 are switched so that buffer 72 is used to accumulate current-squared samples of next pulse 142 of waveform 34, while buffer 70 in which the current-squared samples of pulse 140 are accumulated is shifted 152 into the background. In background processing, the current-squared sum is divided 154 by the number of samples N and the square-root is taken 156 to complete the rms algorithm. The computed rms current value for pulse 140 is written 158 to a register for use in welding process control.

Figure 5:
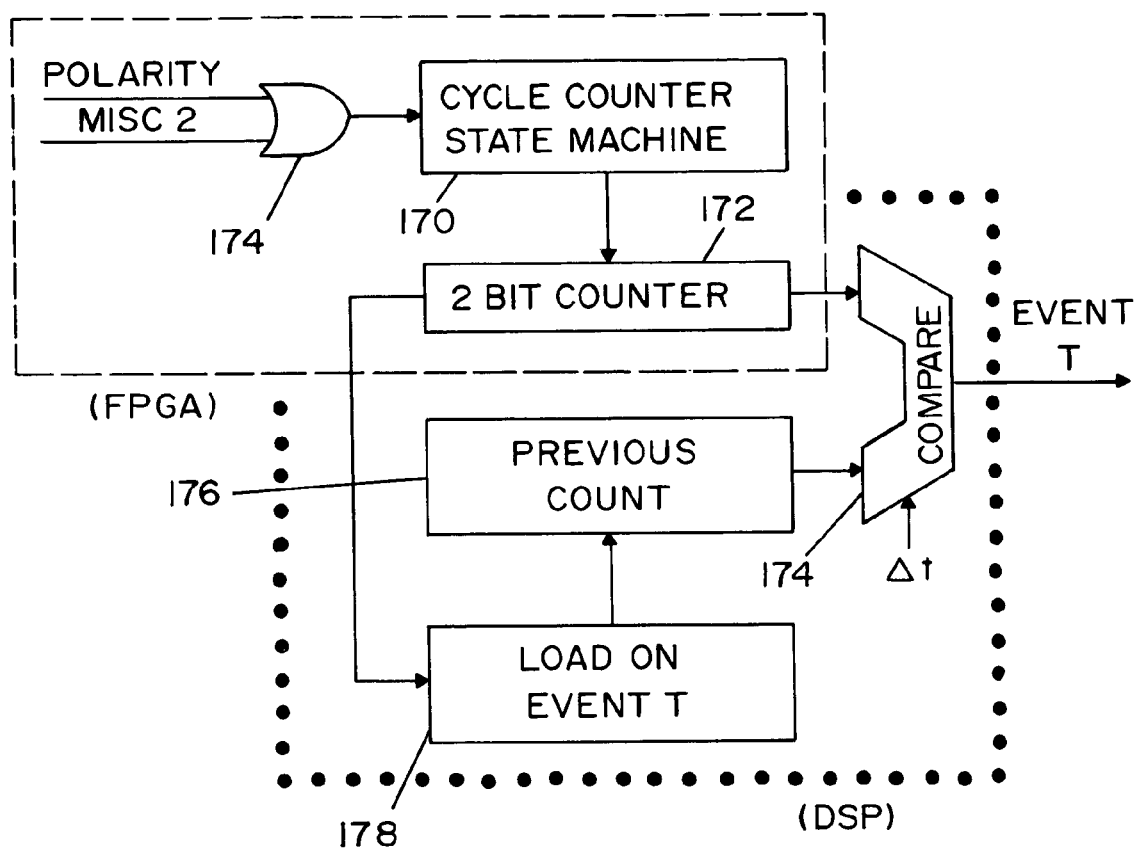
FIG. 5 is a block diagram and flow chart of the cycle counter in a field programmable gate array incorporated in the controller and a block diagram of the use of this cycle counter information in the digital signal processor (DSP) to obtain an event signal T.

With reference to FIG. 5, a suitable method for generating event signals T is described. A field programmable gate array (FPGA) includes cycle counter state machine 170 that updates two-bit counter 172. State machine 170 is configured to increment two-bit counter 172 each time the state changes. Each change of state corresponds to an occurrence of event signal T. In the digital signal processing (DSP), two-bit comparator 174 compares the value of two-bit counter 172 with previous counter value register 176 during fourth cycle 136 of FIG. 2A. A change in the value of two-bit counter 172 indicated by the comparison corresponds to an occurrence of event signal T. Responsive to event signal T, digital gate 178 loads the new value of two-bit counter 172 into previous counter value register 176. In this arrangement, the value stored in two-bit counter 172 is not significant; rather, a change in the counter value is detected.

Figure 5A:
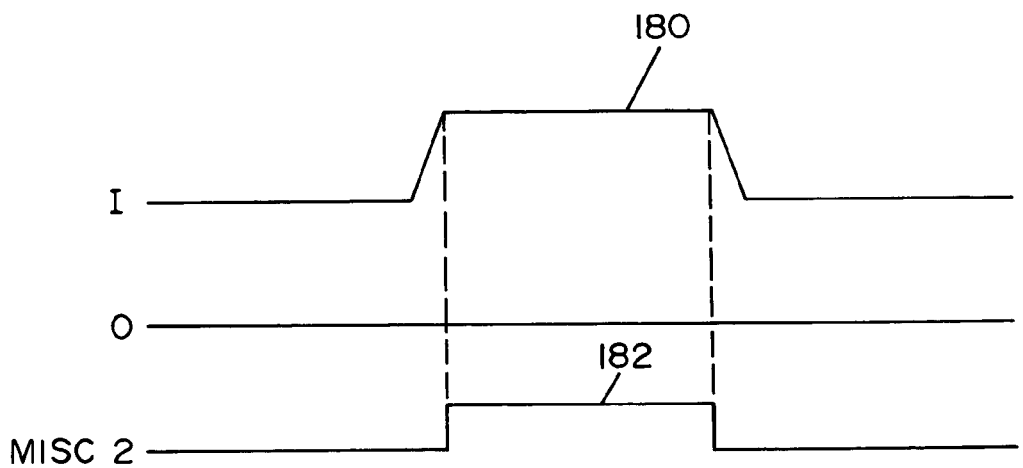
FIG. 5A is a graph of the pulse current and logic at one terminal of the flow chart shown in FIG. 5 when pulse welding is used instead of A.C. welding.

With continuing reference to FIG. 5 and with further reference to FIG. 5A, the polarity of waveform 34 along with an auxiliary "Misc2" signal are input to state machine 170 through "OR" gate 174. This arrangement enables the FPGA to generate event signals T for pulse welding and for a.c. welding. In the case of a.c. welding, Misc2 is set to zero so that the polarity signal feeds through to cycle counter state machine 170. For pulse welding, Misc2 is set to one when the arc is shorted, and zero when the arc is not shorted. FIG. 5A shows a graph of pulse current 180 and the value of Misc2 182 when pulse welding is used instead of A.C. welding.

Figure 3:
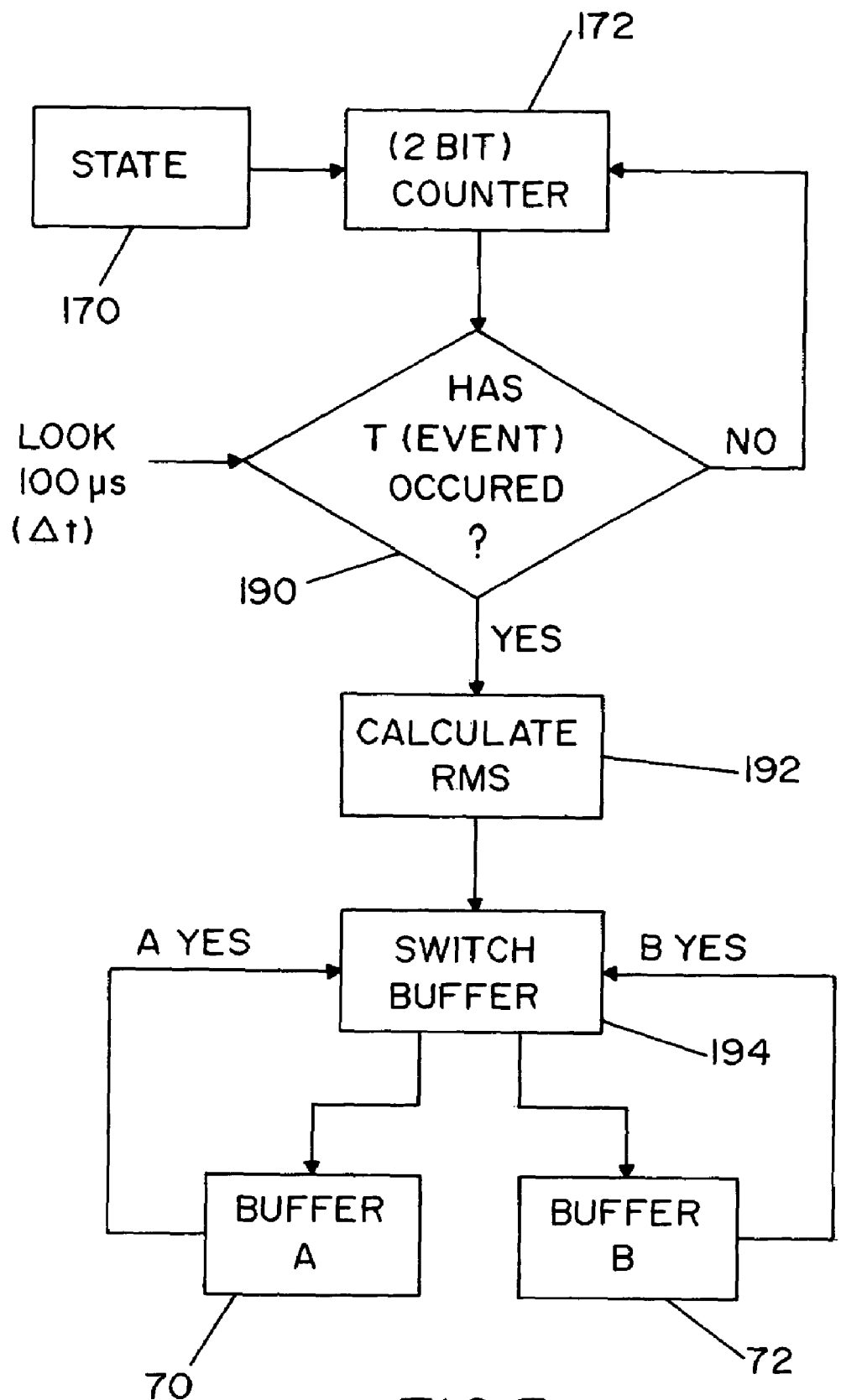
FIG. 3 is a flow chart of the program for implementing aspects of the cycles in FIG. 2A after creation of an event signal T.

With continuing reference to FIG. 5 and with further reference to FIG. 3, events initiated by an occurrence of event signal T are described. At fourth cycle 136 of FIG. 2A, the digital signal processing performs a check 190 to see if an occurrence of event signal T has been detected. This is done by comparing the current value of two-bit counter 172 with stored counter value 176 using two-bit comparator 174. If no change in counter value has occurred, the digital signal processing continues to loop through the four states 130, 132, 134, 136 of FIG. 2A. However, if check 190 detects an occurrence of event signal T, the rms value is computed 192 as set forth in Equation (3) and in accordance with FIGS. 2 and 7. Computation 192 is a background digital signal process. Additionally, a buffer switch 194 is performed so that whichever buffer (buffer A 70 or buffer B 72) had been active is switched to the background, and whichever buffer (buffer B 72 or buffer A 70) had been the background buffer is made the active accumulation buffer.

Exemplary digital signal processing circuitry and associated FPGA circuitry for substantially real-time computation of rms voltage $V_{rms}$, rms current $I_{rms}$, and average power $P_{avg}$ have been described with reference to FIGS. 1–9. The described digital signal processing circuitry implements Equations (1) and (3) using Riemann sums, and is exemplary only. Those skilled in the art can readily modify the illustrated digital circuitry or substitute other digital circuitry to perform these computations or substantial equivalents thereof. The illustrated circuitry provides certain features that may be optionally omitted or modified. For example, separate and independent digital signal processing pathways can be provided for computing each of the rms voltage $V_{rms}$, rms current $I_{rms}$, and average power $P_{avg}$ values. In this arrangement, time-domain multiplexing aspects of the circuitry can be omitted. Rather than having two alternating accumulators, a single accumulator can be employed in conjunction with a storage register that stores the previous sum for background normalization/square root processing. Moreover, if the digital signal processing is sufficiently fast or if parallel processing is employed, the temporary storage may be omitted entirely, and the normalization/square root processing performed substantially in real time for intervals between successive event signals T. Still further, a trapezoidal or otherwise-shaped integral element can be substituted for rectangular sample bars 122 of the Riemann sum illustrated in FIG. 4. Those skilled in the art can make other modifications to the exemplary digital signal processing and FPGA circuitry illustrated herein for implementing Equations (1) and (3) as digital circuitry.

Figure 10:
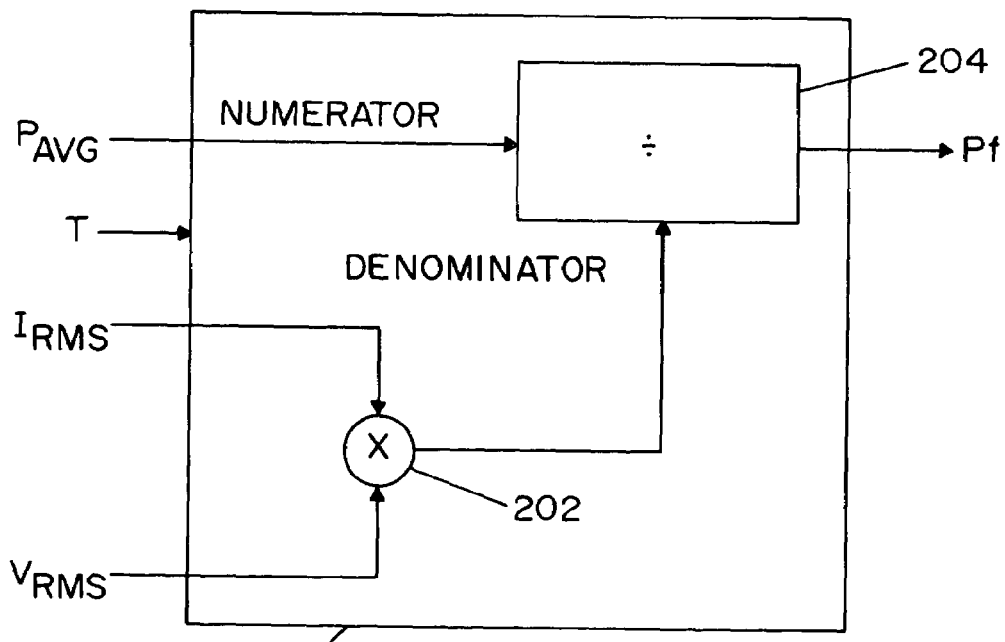
FIG. 10 is a block diagram showing the aspect of the present invention for creating the actual power factor of the welding process for use in the present invention.

With reference to FIG. 10, digital signal processing block 200 computes the power factor (PF) in accordance with Equation (4) from the rms voltage $V_{rms}$, rms current $I_{rms}$, and average power $P_{avg}$ values. The denominator of Equation (4) is computed using multiplier 202 acting on the rms current $I_{rms}$ and rms voltage $V_{rms}$ output by digital signal processing blocks 60, 60' of FIGS. 7 and 8, respectively. The average power $P_{avg}$ output by digital signal processing bloc 60" of FIG. 9 is divided by this denominator using division block 204 to compute the power factor PF.

Figure 11:
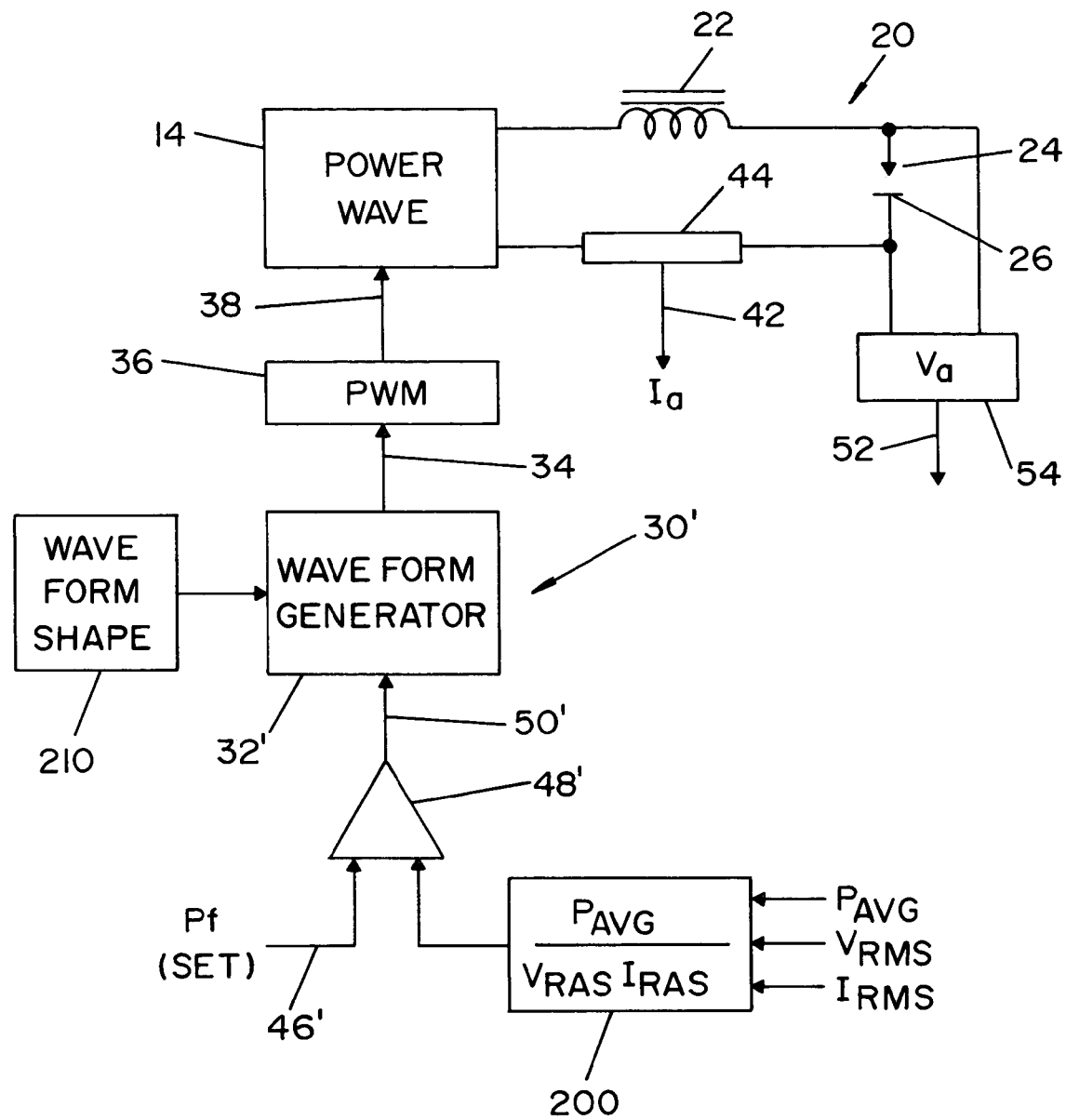
FIG. 11 is a block diagram of a welder utilizing the power factor value of FIG. 10 to maintain a constant power factor for the weld process in pulse welding.

With continuing reference to FIG. 10 and with further reference to FIG. 11, electric arc welder 10 of FIG. 1 is readily adapted to implement a constant power factor control of the weld process in pulse welding. Controller 30' is a modified version of controller 30 of FIG. 1. Digital error amplifier 48' produces error signal 50' based on the power factor PF. Digital error amplifier 48' compares the power factor PF output by digital signal processing block 200 (shown in detail in FIG. 10) with PF set value 46'. Waveform generator 32' modifies selected waveform shape 210 based on error signal 50' as described in Blankenship U.S. Pat. No. 5,278,390 which is incorporated by reference herein.

Figures 12, 13:
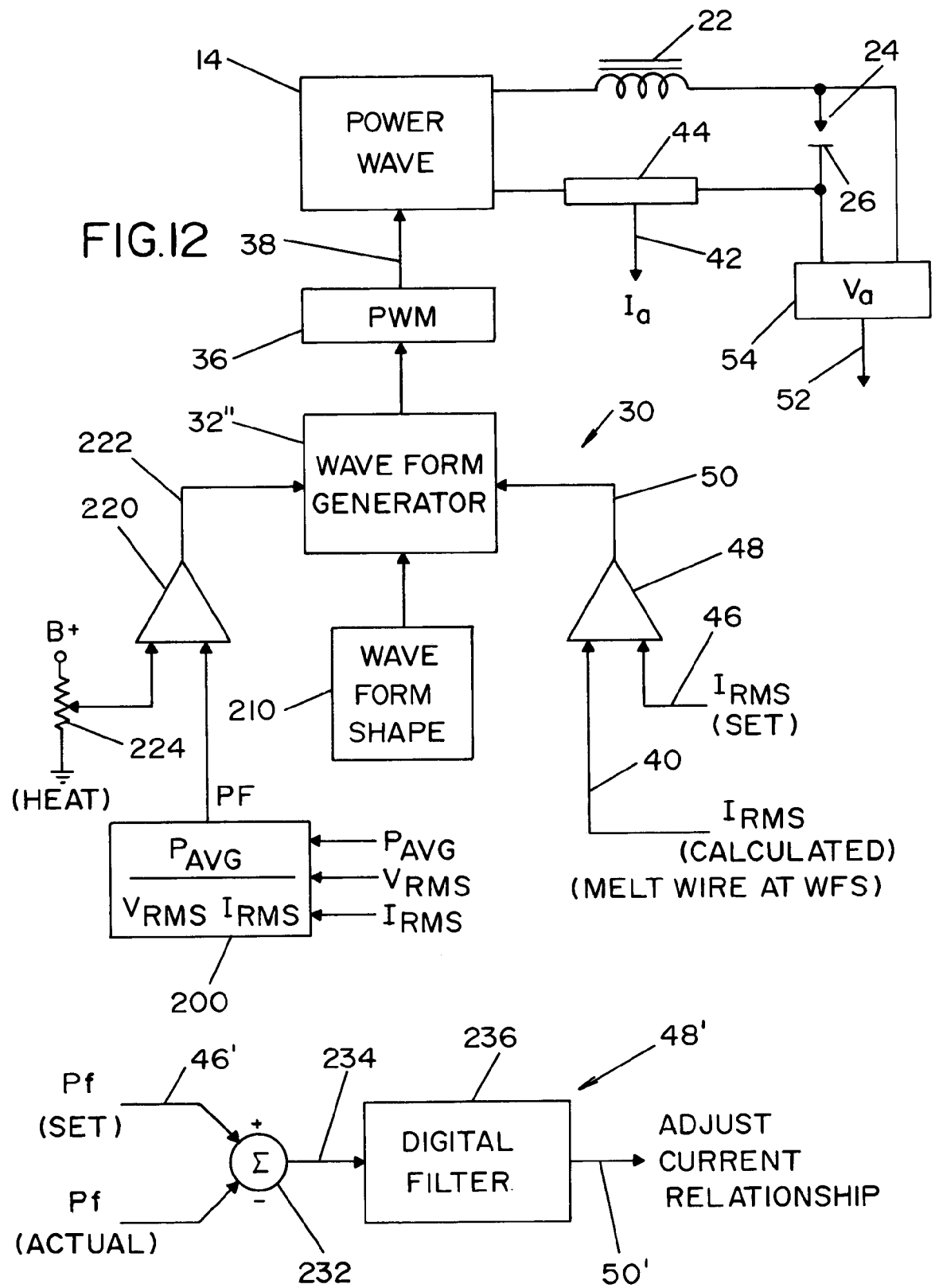
FIG. 12 is a block diagram, as shown in FIG. 11, wherein the power factor value from FIG. 10 is adjusted manually to control the power factor of the welding process while maintaining the rms current constant.
FIG. 13 is a block diagram showing a standard digital filter controlled by the relationship of the actual power factor to the set power factor to adjust the shape of the weld current by adjusting the waveform generator input to maintain a constant power factor.

With continuing reference to FIG. 10 and with further reference to FIG. 12, electric arc welder 10 of FIG. 1 is similarly readily adapted to implement a constant current welding process in which heat input to the weld is controlled by adjusting the power factor PF. Controller 30" is a modified version of controller 30 of FIG. 1. The rms current 40 is compared with set rms current 46 by digital error amplifier 48 to produce current error signal 50 as in FIG. 1. Additionally, a second digital error amplifier 220 produces power factor error signal 222 by comparing the power factor PF output by digital signal processing block 200 (shown in detail in FIG. 10) with adjustable welding heat set value 224. Waveform generator 32" modifies selected waveform shape 210 based on error signals 50, 222 as described in Blankenship U.S. Pat. No. 5,278,390.

With reference returning to FIG. 11 and with further reference to FIG. 13, in digital error amplifier 48' the power factor error signal optionally incorporates digital filtering. As shown in FIG. 13, digital error amplifier 48' includes difference operator 232 that computes difference signal 234 which is proportional to a difference between the computed power factor and power factor set value 46'. Difference value 234 is input into digital filter 236 which generates control signal 50' for adjusting the waveform shape in accordance with the method described in Blankenship U.S. Pat. No. 5,278,390. In one suitable embodiment, digital filter 236 is an infinite impulse response filter. The digital filter can be used to amplify the signal, smooth the signal, remove high frequency signal components, or otherwise adjust the control signal.

Figure 14:
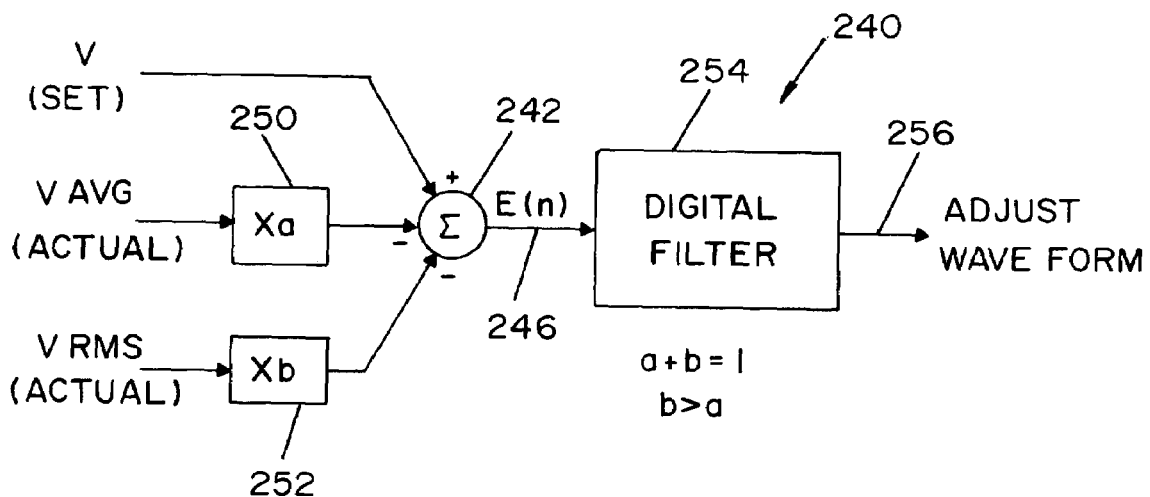
FIG. 14 is a block diagram showing control of the welder by a relationship of average voltage and a rms voltage compared with a set voltage signal to adjust the shape of the waveform to maintain a set voltage.

With reference to FIG. 14, a digital error amplifier 240 for constant voltage control is shown. Digital error amplifier 240 includes difference operator 242 that computes difference signal E(n) 246 given by:

$$E(n) = V_{set} - (a \cdot V_{avg} + b \cdot V_{rms}) \qquad (6),$$

where $V_{set}$ is a set voltage value, $V_{avg}$ is an average voltage value computed in accordance with Equation (5), a is an average voltage weighting factor implemented by multiplier 250, $V_{rms}$ is the rms voltage of Equation (3) that is output by digital signal processing block 60' of FIG. 8, and b is an rms voltage weighting factor implemented by multiplier 252. It will be recognized that difference signal E(n) 246 can be biased by adjusting the weighting factors a and b toward average voltage control, rms voltage control, or a selected weighted combination of average voltage and rms voltage control. Because the rms voltage is typically a better measure of the true heat input to the weld by the welding process, the rms weight b is preferably greater than the average weight a, that is, b>a. Moreover, the sum of the weighting factors is preferably unity, that is, a+b=1. Optionally, difference signal E(n) 246 is processed by digital filter 254, such as an infinite impulse response filter, to amplify, smooth, or otherwise manipulate difference signal E(n) 246 to produce control signal 256 for adjusting the waveform shape in accordance with the method described in Blankenship U.S. Pat. No. 5,278,390.

Figure 15:
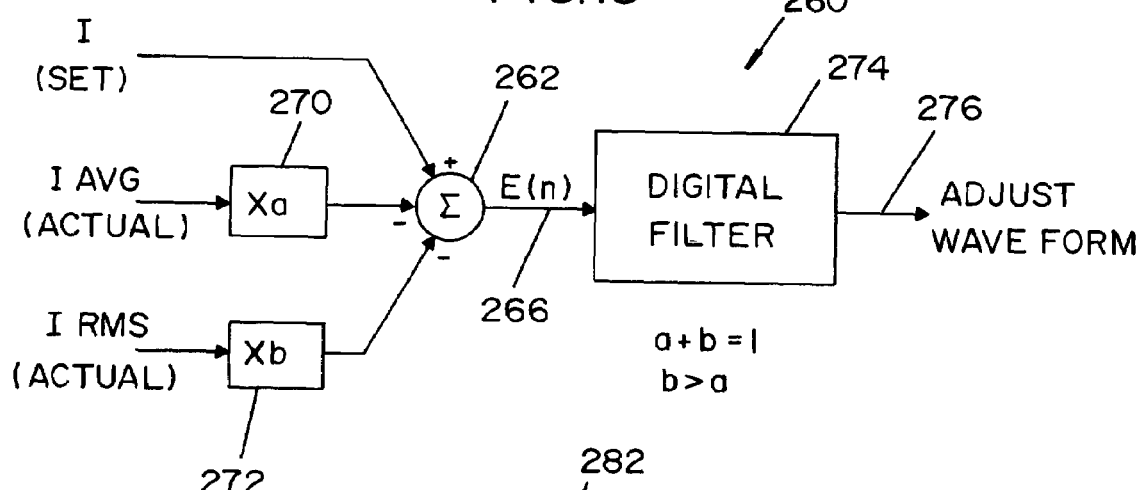
FIG. 15 is a block diagram showing control of the welder by a relationship of average current and a rms current compared with a set current signal to adjust the shape of the waveform to maintain a set current.

With reference to FIG. 15, a digital error amplifier 260 for constant current control is shown. Digital error amplifier 260 includes difference operator 262 that computes difference signal E(n) 266 given by:

$$E(n) = I_{set} - (a \cdot I_{avg} + b \cdot I_{rms}) \qquad (7),$$

where $I_{set}$ is a set current value, $I_{avg}$ is an average current value computed in accordance with Equation (5), a is an average current weighting factor implemented by multiplier 270, $I_{rms}$ is the rms current of Equation (3) that is output by digital signal processing block 60 of FIG. 7, and b is an rms current weighting factor implemented by multiplier 272. It will be recognized that difference signal E(n) 266 can be biased by adjusting the weighting factors a and b toward average current control, rms current control, or a selected weighted combination of average current and rms current control. Because the rms current is typically a better measure of the true heat input to the weld by the welding process, the rms weight b is preferably greater than the average weight a, that is, b>a. Moreover, the sum of the weighting factors is preferably unity, that is, a+b=1. Optionally, difference signal E(n) 266 is processed by digital filter 274, such as an infinite impulse response filter, to amplify, smooth, or otherwise manipulate difference signal E(n) 266 to produce control signal 276 for adjusting the waveform shape in accordance with the method described in Blankenship U.S. Pat. No. 5,278,390.

Figure 15A:
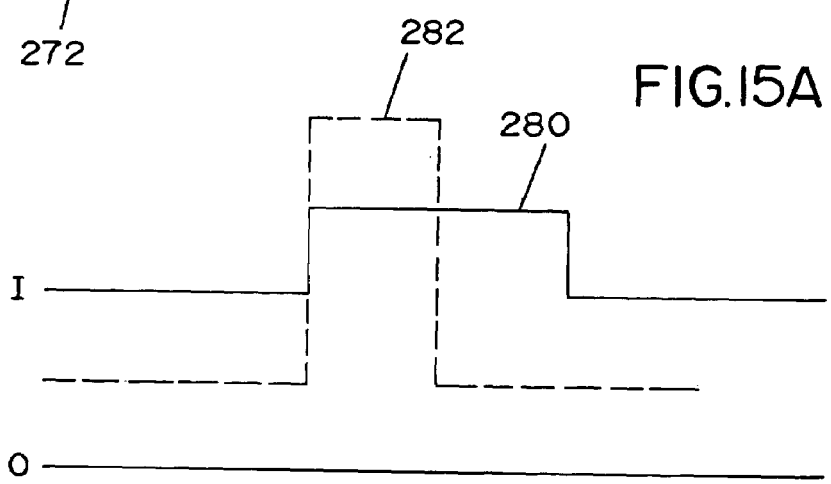
FIG. 15A is a current graph showing how the waveform is adjusted to maintain the set value, be it current, voltage or power factor; and, FIG. 16 is a block diagram showing a digital filter to adjust the wire feed speed based upon a comparison of a set voltage to a signal involving a component of average and rms voltage and also a digital filter to adjust the waveform upon a comparison of a set current to a signal involving a component of average and rms current.

With reference to FIG. 15A, an exemplary waveform shape adjustment in accordance with the waveform shape adjustment method of Blankenship U.S. Pat. No. 5,278,390 is illustrated. Two waveforms 280, 282 are shown in solid and dashed lines, respectively. For b=1 and a=0 in Equation (6) or Equation (7) (for voltage control or current control, respectively), waveforms 280, 282 have equal rms values. However, the average value is generally different for waveforms 280, 282. Compared with waveform 280, waveform 282 has a reduced voltage or current background magnitude and an increased voltage or current magnitude in the pulse.

Moreover, it will be appreciated that the pulse repetition period of waveforms 280, 282 may be different. This difference in repetition period is accounted for in the digital signal processing by performing the Riemann sums of Equations (1), (3), and (5) over intervals between successive event signals T, instead of performing the Riemann summing over time intervals of fixed length. Generating event signals T at a rising pulse edge or other identifiable characteristic of the waveform allows the summation interval to track the repetition period of the waveform as the repetition period is adjusted by the waveform shaping.

Figure 16:
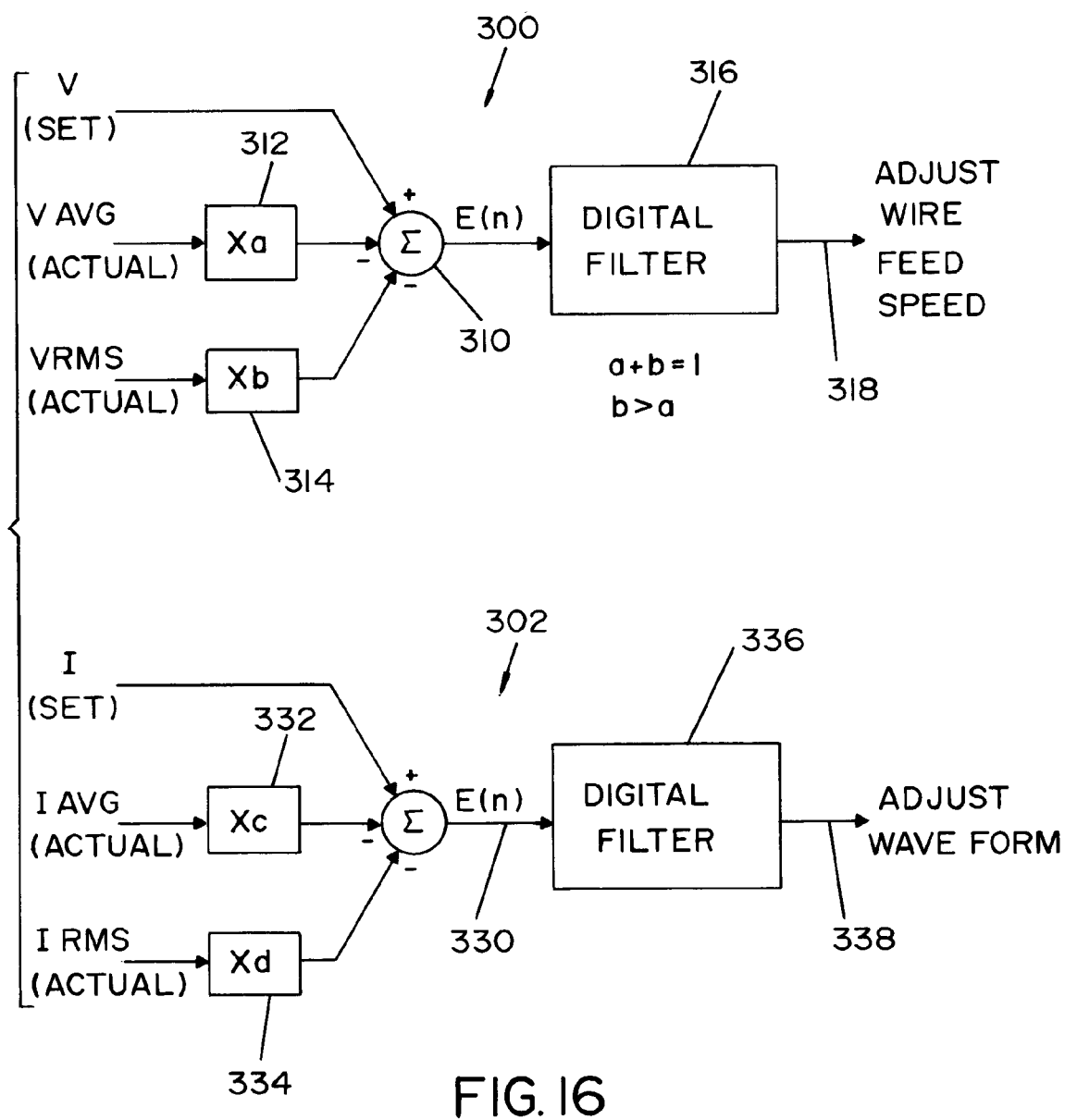

With reference to FIG. 16, two digital error amplifiers 300, 302 compute current and voltage error signals for use in a constant current, constant voltage welding process control. Digital error amplifier 300 includes difference operator 310, weighting factors a 312 and b 314, and digital filter 316. Digital error amplifier 300 has the same voltage inputs and general circuit topology as amplifier 240 of FIG. 14; however, digital error amplifier 300 produces control signal 318 for controlling wire feed speed during the welding process. With increasing output of amplifier 300 the wire feed speed should be decreased, while with decreasing output of amplifier 300 the wire feed speed should be increased. Digital amplifier 302 includes difference operator 330, weighting factors c 332 and d 334, and digital filter 336. Digital error amplifier 302 has the same current inputs and general circuit topology as amplifier 260 of FIG. 15, and produces control output 338 for adjusting the waveform shape in accordance with the method described in Blankenship U.S. Pat. No. 5,278,390. Hence, the waveform shape and the wire feed speed are simultaneously controlled using digital error amplifiers 300, 302 to keep both voltage and current constant.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus defined the invention, the following is claimed:

1. An electric arc welder for performing a given weld process with selected current waveform performed between an electrode and a workpiece, said welder comprising a controller with a digital processor, a sensor for reading the instantaneous weld current, and a circuit to convert said instantaneous current into a digital representation of the level of said instantaneous weld current, said digital processor having a program circuit to periodically read and square said digital representation at a given rate, a register for summing a number N of said square digital representation to give a summed value, and an algorithm for periodically dividing the summed value by said number N to provide a quotient and then taking the square root of said quotient to thereby digitally construct a rms signal representing the root mean square of said weld current over the current waveform period.

2. An electric arc welder as defined in claim 1 wherein said controller includes a feedback control loop with an error detector for generating a current control signal based upon the relationship of two signals, the first signal of which includes said rms signal.

3. An electric arc welder as defined in claim 2 wherein said waveform is created by a number of current pulses occurring at a frequency of at least 18 kHz with a magnitude of each pulse controlled by a wave shaper.

4. An electric arc welder as defined in claim 3 wherein said digital processor includes a circuit controlled by said waveform to create an event signal at a given location in said waveform and a program to initiate said algorithm upon creation of said event signal.

5. An electric arc welder as defined in claim 2 wherein said digital processor has a first and second register for summing said squared digital representations, a circuit controlled by said waveform to create an event signal at a given location in said waveform, and a program to alternate said first and second register upon creation of said event signal.

6. An electric arc welder as defined in claim 5 wherein said waveform is created by a number of current pulses occurring at a frequency of at least 18 kHz with a magnitude of each pulse controlled by a wave shaper.

7. An electric arc welder as defined in claim 5 including a digital counter to count at said given rate to obtain the number N upon creation of said event signal.

8. An electric arc welder as defined in claim 2 wherein said digital processor includes a circuit controlled by said waveform to create an event signal at a given location in said waveform and a program to initiate said algorithm upon creation of said event signal.

9. An electric arc welder as defined in claim 8 wherein said waveform is created by a number of current pulses occurring at a frequency of at least 18 kHz with a magnitude of each pulse controlled by a wave shaper.

10. An electric arc welder as defined in claim 8 including a digital counter to count at said given rate to obtain the number N upon creation of said event signal.

11. An electric arc welder as defined in claim 1 wherein said waveform is created by a number of current pulses occurring at a frequency of at least 18 kHz with a magnitude of each pulse controlled by a wave shaper.

12. An electric arc welder as defined in claim 11 wherein said digital processor has a first and second register for summing said squared digital representations, a circuit controlled by said waveform to create an event signal at a given location in said waveform, and a program to alternate said first and second register upon creation of said event signal.

13. An electric arc welder as defined in claim 12 wherein said waveform is created by a number of current pulses occurring at a frequency of at least 18 kHz with a magnitude of each pulse controlled by a wave shaper.

14. An electric arc welder as defined in claim 11 wherein said digital processor includes a circuit controlled by said waveform to create an event signal at a given location in said waveform and a program to initiate said algorithm upon creation of said event signal.

15. An electric arc welder as defined in claim 1 wherein said given rate is less than about 40 kHz.

16. An electric arc welder as defined in claim 15 wherein said digital processor includes a circuit controlled by said waveform to create an event signal at a given location in said waveform and a program to initiate said algorithm upon creation of said event signal.

17. An electric arc welder as defined in claim 1 wherein said given rate is in the general range of 100 kHz to 5 kHz.

18. An electric arc welder as defined in claim 17 wherein said digital processor has a first and second register for summing said squared digital representations, a circuit controlled by said waveform to create an event signal at a given location in said waveform, and a program to alternate said first and second register upon creation of said event signal.

19. An electric arc welder as defined in claim 18 wherein said waveform is created by a number of current pulses occurring at a frequency of at least 18 kHz with a magnitude of each pulse controlled by a wave shaper.

20. An electric arc welder as defined in claim 19 including a digital counter to count at said given rate to obtain the number N upon creation of said event signal.

21. An electric arc welder as defined in claim 18 including a digital counter to count at said given rate to obtain the number N upon creation of said event signal.

22. An electric arc welder as defined in claim 17 wherein said digital processor includes a circuit controlled by said waveform to create an event signal at a given location in said waveform and a program to initiate said algorithm upon creation of said event signal.

23. An electric arc welder as defined in claim 22 including a digital counter to count at said given rate to obtain the number N upon creation of said event signal.

24. An electric arc welder as defined in claim 1 wherein said digital processor includes a circuit controlled by said waveform to create an event signal at a given location in said waveform and a program to initiate said algorithm upon creation of said event signal.

25. An electric arc welder as defined in claim 24 wherein said waveform is created by a number of current pulses occurring at a frequency of at least 18 kHz with a magnitude of each pulse controlled by a wave shaper.

26. An electric arc welder as defined in claim 25 including a digital counter to count at said given rate to obtain the number N upon creation of said event signal.

27. An electric arc welder as defined in claim 24 including a digital counter to count at said given rate to obtain the number N upon creation of said event signal.

28. An electric arc welder for performing a given weld process with selected current waveform performed between an electrode and a workpiece, said welder comprising a controller with a digital processor, a sensor for reading the instantaneous weld current, and a circuit to convert said instantaneous current into a digital representation of the level of said instantaneous weld current, said digital processor having a program circuit to periodically read and square said digital representation at a given rate, a register for summing a number N of said square digital representation to give a summed value, and an algorithm for periodically dividing the summed value by said number N to provide a quotient and then taking the square root of said quotient to thereby digitally construct a rms signal representing the root mean square of said weld current, and further including a circuit to create an average current signal representing the average weld current and a summing circuit to create a first signal by adding values proportional to said rms signal and said average signal, said controller further including a feedback control loop with an error detector for generating a current control signal based upon the relationship of two signals, the first of which includes the first signal.

29. An electric arc welder as defined in claim 28 wherein said first signal includes a first contributing component equal to a times average current signal and b times said rms signal.

30. An electric arc welder as defined in claim 29 wherein $a+b=1$.

31. An electric arc welder as defined in claim 30 wherein b is greater than a.

32. An electric arc welder as defined in claim 31 wherein said waveform is created by a number of current pulses occurring at a frequency of at least 18 kHz with a magnitude of each pulse controlled by a wave shaper.

33. An electric arc welder as defined in claim 30 wherein said waveform is created by a number of current pulses occurring at a frequency of at least 18 kHz with a magnitude of each pulse controlled by a wave shaper.

34. An electric arc welder as defined in claim 29 wherein b is greater than a.

35. An electric arc welder as defined in claim 34 wherein said waveform is created by a number of current pulses occurring at a frequency of at least 18 kHz with a magnitude of each pulse controlled by a wave shaper.

36. An electric arc welder as defined in claim 29 wherein said waveform is created by a number of current pulses occurring at a frequency of at least 18 kHz with a magnitude of each pulse controlled by a wave shaper.

37. An electric arc welder as defined in claim 29 wherein said digital processor includes a circuit controlled by said waveform to create an event signal at a given location in said waveform and a program to initiate said algorithm upon creation of said event signal.

38. An electric arc welder as defined in claim 37 wherein said waveform is created by a number of current pulses occurring at a frequency of at least 18 kHz with a magnitude of each pulse controlled by a wave shaper.

39. An electric arc welder as defined in claim 28 wherein said first signal includes a first contributing component equal to a times average current signal and b times said rms signal.

40. An electric arc welder as defined in claim 39 wherein $a+b=1$.

41. An electric arc welder as defined in claim 40 wherein b is greater than a.

42. An electric arc welder as defined in claim 41 wherein said waveform is created by a number of current pulses occurring at a frequency of at least 18 kHz with a magnitude of each pulse controlled by a wave shaper.

43. An electric arc welder as defined in claim 40 wherein said waveform is created by a number of current pulses occurring at a frequency of at least 18 kHz with a magnitude of each pulse controlled by a wave shaper.

44. An electric arc welder as defined in claim 40 wherein b is greater than a.

45. An electric arc welder as defined in claim 44 wherein said waveform is created by a number of current pulses occurring at a frequency of at least 18 kHz with a magnitude of each pulse controlled by a wave shaper.

46. An electric arc welder as defined in claim 39 wherein said waveform is created by a number of current pulses occurring at a frequency of at least 18 kHz with a magnitude of each pulse controlled by a wave shaper.

47. An electric arc welder as defined in claim 28 wherein said waveform is created by a number of current pulses occurring at a frequency of at least 18 kHz with a magnitude of each pulse controlled by a wave shaper.

48. An electric arc welder as defined in claim 47 wherein said digital processor includes a circuit controlled by said waveform to create an event signal at a given location in said waveform and a program to initiate said algorithm upon creation of said event signal.

49. An electric arc welder as defined in claim 28 wherein said digital processor includes a circuit controlled by said waveform to create an event signal at a given location in said waveform and a program to initiate said algorithm upon creation of said event signal.

50. An electric arc welder as defined in claim 49 wherein said waveform is created by a number of current pulses occurring at a frequency of at least 18 kHz with a magnitude of each pulse controlled by a wave shaper.

51. An electric arc welder as defined in claim 49 including a digital counter to count at said given rate to obtain the number N upon creation of said event signal.

52. An electric arc welder for performing a given weld process with selected current waveform performed between an electrode and a workpiece, said welder comprising a controller with a digital processor, a sensor for reading the instantaneous weld current, and a circuit to convert said instantaneous current into a digital representation of the level of said instantaneous weld current, said digital processor having a program circuit to periodically read and square said digital representation at a given rate, a first and second register for summing a number N of said squared digital representations to give a summed value, an algorithm for periodically dividing the summed value by said number N to provide a quotient and then taking the square root of said quotient to thereby digitally construct a rms signal representing the root mean square of said weld current, said circuit being controlled by said waveform to create an event signal at a given location in said waveform and to alternate said first and second register upon creation of said event signal.

53. An electric arc welder as defined in claim 52 wherein said waveform is created by a number of current pulses occurring at a frequency of at least 18 kHz with a magnitude of each pulse controlled by a wave shaper.

54. An electric arc welder as defined in claim 52 including a digital counter to count at said given rate to obtain the number N upon creation of said event signal.

55. An electric arc welder for performing a given welding process with a selected current waveform performed between an electrode and a workpiece, said welder comprising a controller with a digital processor, a sensor for reading the instantaneous weld current of said waveform and a circuit to convert said instantaneous weld current into a digital representation of the level of said instantaneous weld current, said digital processor having a program circuit to periodically read said digital representation at a given rate and an algorithm for processing said digital representations into a current root mean square (rms) signal in which the mean is taken over at least a contiguous current waveform period.

56. An electric arc welder as defined in claim 55 wherein said controller includes a feedback control loop with an error detector for generating a current control signal based upon the relationship of two signals, the first signal of which includes said rms signal.

57. An electric arc welder as defined in claim 56 including a circuit to create an average current signal representing the average weld current and a summing circuit to create said first signal by adding values proportional to said rms signal and said average signal.

58. An electric arc welder as defined in claim 57 wherein said first signal includes a first contributing component equal to a times average current signal and b times said rms signal.

59. An electric arc welder as defined in claim 58 wherein a+b=1.

60. An electric arc welder as defined in claim 58 wherein said waveform is created by a number of current pulses occurring at a frequency of at least 18 kHz with a magnitude of each pulse controlled by a wave shaper.

61. An electric arc welder as defined in claim 57 wherein a+b=1.

62. An electric arc welder as defined in claim 61 wherein said waveform is created by a number of current pulses occurring at a frequency of at least 18 kHz with a magnitude of each pulse controlled by a wave shaper.

63. An electric arc welder as defined in claim 57 wherein said waveform is created by a number of current pulses occurring at a frequency of at least 18 kHz with a magnitude of each pulse controlled by a wave shaper.

64. An electric arc welder as defined in claim 57 wherein said waveform is created by a number of current pulses occurring at a frequency of at least 18 kHz with a magnitude of each pulse controlled by a wave shaper.

65. An electric arc welder as defined in claim 56 wherein said waveform is created by a number of current pulses occurring at a frequency of at least 18 kHz with a magnitude of each pulse controlled by a wave shaper.

66. An electric arc welder as defined in claim 55 wherein said waveform is created by a number of current pulses occurring at a frequency of at least 18 kHz with a magnitude of each pulse controlled by a wave shaper.

67. An electric arc welder as defined in claim 55 wherein said given rate is less than about 40 kHz.

68. An electric arc welder as defined in claim 55 wherein said given rate is in the general range of 100 kHz to 5 kHz.

69. An electric arc welder as defined in claim 55 wherein said digital processor includes a circuit controlled by said waveform to create an event signal at a given location in said waveform and a program to initiate said algorithm upon creation of said event signal.

70. An electric arc welder for performing a given weld process with a selected current waveform performed between an electrode and a workpiece, said welder comprising a controller with a digital processor, said controller having a waveform generator for creating a number of current pulses occurring at a frequency of at least 18 kHz with a magnitude for each pulse creating said waveform and a feedback current control loop with an error detector for generating a current control signal based upon the relationship of two signals, the first signal of which includes an actual rms current signal over the whole waveform generated by an algorithm processed by said digital processor.

71. A welder as defined in claim 70 wherein said second of said two signals is a signal representing the desired current rms signal.

72. An electric arc welder as defined in claim 71 wherein said first signal includes a first contributing component equal to a times average current signal and b times said rms signal.

73. An electric arc welder as defined in claim 71 wherein said given rate is less than about 40 kHz.

74. An electric arc welder as defined in claim 71 wherein said given rate is in the general range of 100 kHz to 5 kHz.

75. An electric arc welder as defined in claim 70 wherein said first signal includes a first contributing component equal to a times average current signal and b times said rms signal.

76. An electric arc welder as defined in claim 75 wherein a+b=1.

77. An electric arc welder as defined in claim 76 wherein b is greater than a.

78. An electric arc welder as defined in claim 75 wherein b is greater than a.

79. An electric arc welder as defined in claim 70 wherein said given rate is less than about 40 kHz.

80. An electric arc welder as defined in claim 70 wherein said given rate is in the general range of 100 kHz to 5 kHz.

81. A method of operating an electric arc welder for performing a given weld process with selected current waveform performed between an electrode and a workpiece, said welder comprising a controller with a digital processor, said method comprising:
   (a) reading the instantaneous weld current;
   (b) converting said instantaneous current into a digital representation of the level of said instantaneous weld current;
   (c) periodically reading and squaring said digital representation at a given rate;
   (d) summing a number N of said square digital representation to give a summed value;
   (e) periodically dividing and summed value by said number N to provide a quotient;
   (f) taking the square root of said quotient to thereby digitally construct an rms signal representing the root mean square of said weld current;
   (g) creating an average current signal representing the average weld current; and,
   (h) creating a first signal by adding values proportional to said rms signal and said average signal.

82. A method as defined in claim 81 wherein said controller includes a feedback control loop with an error detector and the method includes generating a current control signal by said error detector based upon the relationship of two signals, the two signals including said first signal.

83. A method as defined in claim 81 wherein said waveform is created by a number of current pulses occurring at a frequency of at least 18 kHz with a magnitude of each pulse controlled by a wave shaper.

84. A method as defined in claim 81 wherein said given rate is less than about 40 kHz.

85. A method as defined in claim 81 wherein said given rate is in the general range of 100 kHz to 5 kHz.

86. An electric arc welder for performing a given weld process with a selected waveform performed between an electrode and a workpiece, said welder comprising a power source, a circuit for calculating the rms current of said power source, a circuit for determining the average current of said power source and a controller with a closed loop current feedback circuit responsive to a combination of said rms current and said average current.

87. An electric arc welder as defined in claim 86 wherein said combination includes a substantially higher rms current component.

88. An electric arc welder for performing a given weld process with selected current waveform performed between an electrode and a workpiece, said welder comprising:
   a digitizing sensor for acquiring instantaneous digital values of at least one weld parameter; and
   a digital controller that (i) digitally squares the acquired instantaneous digital values and digitally constructs at least one root-mean-square (rms) signal from digitally squared values acquired over at least one period of the current waveform, the at least one rms signal being representative of the at least one weld parameter over the at least one period of the current waveform, and (ii) generates at least one weld control signal based on the at least one digitally constructed rms signal.

89. An electric arc welder as set forth in claim 88 wherein the at least one weld parameter includes at least weld current, and the at least one rms signal includes an rms current representative of the weld current over the at least one period of the current waveform.

90. An electric arc welder as set forth in claim 88 wherein the at least one weld control signal includes a wire feed speed control signal.

91. An electric arc welder as set forth in claim 90 wherein the at least one weld parameter includes a weld voltage, the wire feed speed control signal being generated based on the digitally constructed rms signal corresponding to the weld voltage.

92. An electric arc welder as set forth in claim 88 wherein the at least one weld parameter includes at least weld voltage.

93. An electric arc welder as set forth in claim 88 wherein the at least one weld parameter includes at least weld current and weld voltage.

94. An electric arc welder for performing a pulse welding process with a selected waveform performed between an electrode and workpiece, said welder comprising:
   a power source with a waveform generator having at least one control signal input;
   a sensor monitoring at least one monitored weld parameter;
   a digitizer that digitizes the sensor output to generate digital instantaneous weld parameter samples corresponding to the at least one monitored weld parameter; and
   a digital controller that (i) digitally computes at least one root-mean-square (rms) value corresponding to the at least one monitored weld parameter in which the mean is taken over a contiguous time interval spanning at least one period of the waveform and (ii) computes, based on the at least one rms value, at least one control signal that is input to the at least one control signal input of the power source.

95. A welder as set forth in claim 94, wherein the at least one monitored weld parameter includes weld current.

96. A welder as set forth in claim 94, wherein the digital controller computes at least a wire feed speed control signal.

97. A welder as set forth in claim 96, wherein the at least one monitored weld parameter includes weld voltage, and the wire feed speed control signal is computed based on the rms value corresponding to the weld voltage.

98. A welder as set forth in claim 94, wherein the at least one monitored weld parameter includes weld current and weld voltage, and the at least one control signal is computed based on a power factor derived from the digitally computed rms values corresponding to weld current and weld voltage.

99. A welder as set forth in claim 94, wherein the at least one control signal includes a waveform shape control signal whose value determines a shape of the selected waveform.

100. A welder as set forth in claim 99, wherein the at least one monitored weld parameter includes weld current, and the waveform shape control signal is computed based on the rms value corresponding to the weld current.

* * * * *